(12) United States Patent
Kuppe et al.

(10) Patent No.: US 11,884,570 B2
(45) Date of Patent: Jan. 30, 2024

(54) PROCESS FOR MANUFACTURING AN OPTICAL ELEMENT FROM GLASS

(71) Applicant: Docter Optics SE, Neustadt an der Orla (DE)

(72) Inventors: Alexander Kuppe, Neustadt an der Orla (DE); Annegret Diatta, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 80 days.

(21) Appl. No.: 17/587,408

(22) Filed: Jan. 28, 2022

(65) Prior Publication Data
US 2022/0298049 A1 Sep. 22, 2022

(30) Foreign Application Priority Data

Feb. 1, 2021 (DE) .................... 10 2021 102 289.4
Jan. 25, 2022 (DE) .................... 10 2022 101 728.1

(51) Int. Cl.
*C03B 9/36* (2006.01)
*C03B 9/38* (2006.01)
(Continued)

(52) U.S. Cl.
CPC ............ *C03B 11/08* (2013.01); *C03B 27/012* (2013.01); *C03B 2215/46* (2013.01); *C03B 2215/50* (2013.01)

(58) Field of Classification Search
CPC . C03B 2215/59; C03B 11/08; C03B 2215/50; C03B 2215/69; C03B 9/197;
(Continued)

(56) References Cited

U.S. PATENT DOCUMENTS

| 821,610 A | 5/1906 | Cox |
| 4,666,496 A | 5/1987 | Fecik |

(Continued)

FOREIGN PATENT DOCUMENTS

| CN | 2763266 Y | * 3/2006 | ............ C03B 11/08 |
| CN | 205049796 | 2/2016 | |

(Continued)

OTHER PUBLICATIONS

International Preliminary Report on Patentability Issued in Corresponding PCT Application No. PCT/DE2021/100136 dated Aug. 23, 2022.

(Continued)

*Primary Examiner* — Galen H Hauth
*Assistant Examiner* — Steven S Lee
(74) *Attorney, Agent, or Firm* — DUANE MORRIS LLP

(57) ABSTRACT

The disclosure concerns to a process for manufacturing an optical element from glass, wherein a blank of glass is tempered, for example in such a way that the blank is cooler in its interior than on its exterior, wherein the tempered blank between a first mold and a second mold, which are moved towards one another to form a closed cavity, is press-molded, for example on both sides, to form the optical element, wherein the first mold and/or the second mold comprises an escape cavity slide which is compressed by the formation of a closed cavity by means of the first mold and the second mold as a function of the volume of the blank, so that, during press-molding, an additional edge which is dependent on the volume of the blank is formed with the optical element.

12 Claims, 26 Drawing Sheets

(51) Int. Cl.
*C03B 17/04* (2006.01)
*B65G 49/06* (2006.01)
*C03B 33/03* (2006.01)
*C03B 33/033* (2006.01)
*B26F 1/38* (2006.01)
*C03B 11/08* (2006.01)
*C03B 27/012* (2006.01)

(58) Field of Classification Search
CPC .......... C03B 9/68; C03B 40/00; C03B 23/03; B29C 43/361
See application file for complete search history.

(56) References Cited

U.S. PATENT DOCUMENTS

| | | | |
|---|---|---|---|
| 5,120,343 | A | 6/1992 | Monji et al. |
| 6,130,777 | A | 10/2000 | Yamashita et al. |
| 7,798,688 | B2 | 9/2010 | Hamkens |
| 2001/0033726 | A1 | 10/2001 | Shie et al. |
| 2002/0153624 | A1 | 10/2002 | Tumlin et al. |
| 2003/0001301 | A1 | 1/2003 | Duroux et al. |
| 2004/0244421 | A1 | 12/2004 | Kato et al. |
| 2005/0054514 | A1 | 3/2005 | Ishioka et al. |
| 2009/0323502 | A1 | 12/2009 | Murata et al. |
| 2010/0246008 | A1 | 9/2010 | Murata et al. |
| 2011/0000260 | A1* | 1/2011 | Hamkens ............... C03B 11/08 65/68 |
| 2011/0266576 | A1 | 11/2011 | Engl et al. |
| 2012/0040044 | A1 | 2/2012 | Uehira et al. |
| 2013/0221551 | A1 | 8/2013 | Genda |
| 2014/0093605 | A1* | 4/2014 | Masuda ................ C03B 11/08 425/395 |
| 2014/0332991 | A1 | 11/2014 | Giessauf et al. |
| 2015/0224723 | A1* | 8/2015 | Hamkens ............... B29D 11/00 264/1.36 |
| 2017/0327402 | A1 | 11/2017 | Fujii |
| 2018/0251395 | A1 | 9/2018 | Akiba et al. |
| 2018/0319048 | A1* | 11/2018 | Huang ..................... B29C 43/50 |
| 2018/0328558 | A1 | 11/2018 | Okubo |
| 2019/0041556 | A1 | 2/2019 | Iwata |
| 2020/0195823 | A1 | 6/2020 | Furutake |
| 2022/0373151 | A1 | 11/2022 | Zhang et al. |

FOREIGN PATENT DOCUMENTS

| | | | |
|---|---|---|---|
| CN | 105819674 | 8/2016 | |
| DE | 1 099 964 | 2/1961 | |
| DE | 2906858 | 9/1980 | |
| DE | 36 02 262 | 5/1987 | |
| DE | 299 14 114 | 11/1999 | |
| DE | 69701714 | 2/2001 | |
| DE | 102 26 471 | 1/2004 | |
| DE | 10 2005 009 556 | 9/2005 | |
| DE | 10 2008 034153 | 1/2010 | |
| DE | 102008054029 | 5/2010 | |
| DE | 102012205196 | 10/2013 | |
| DE | 20 2014 100462 | 3/2014 | |
| DE | 10 2015 001609 | 8/2016 | |
| DE | 10 2015 007 832 | 12/2016 | |
| DE | 10 2017 105 888 | 9/2018 | |
| DE | 10 2015 012 324 | 6/2019 | |
| DE | 10 2020 115078 | 1/2021 | |
| EP | 2402140 | 1/2012 | |
| EP | 2666620 | 11/2013 | |
| EP | 3312501 | 4/2018 | |
| EP | 3520983 | 8/2019 | |
| EP | 3575362 | 12/2019 | |
| JP | 01072822 | 3/1989 | |
| JP | H06-286754 | 10/1994 | |
| JP | H07330347 A | 12/1995 | |
| JP | H0971428 A * | 3/1997 | ............. C03B 11/08 |
| JP | H09124325 A * | 5/1997 | ............. C03B 11/08 |
| JP | 2002160256 | 6/2002 | |
| JP | 2002160256 A * | 6/2002 | ......... B29C 45/1679 |
| JP | 2006062359 | 3/2006 | |
| JP | 2008001530 A * | 1/2008 | ............. C03B 11/08 |
| JP | 2010046895 | 3/2010 | |
| JP | 2018118900 | 8/2018 | |
| JP | 2019135202 | 8/2019 | |
| KR | 101133550 B1 * | 4/2012 | ............. C03B 9/197 |
| KR | 20160028901 | 3/2016 | |
| WO | 2004096724 | 11/2004 | |
| WO | 2009/036739 | 3/2009 | |
| WO | 2009/109209 | 9/2009 | |
| WO | WO-2009109209 A1 * | 9/2009 | ............. C03B 11/08 |
| WO | 2012072192 | 6/2012 | |
| WO | 2014/161014 | 10/2014 | |
| WO | 2017/207079 | 12/2017 | |
| WO | 2019/072326 | 4/2019 | |
| WO | WO-2019072325 A1 * | 4/2019 | ............. C03B 11/08 |
| WO | 2019/179571 | 9/2019 | |
| WO | 2021008647 | 1/2021 | |
| WO | 2021008657 | 1/2021 | |

OTHER PUBLICATIONS

International Search Report and Written Opinion dated Feb. 1, 2022 for Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels—Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
Von Alfred Vollmer, "Matrix-LED-und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern- und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.
International Preliminary Report on Patentability dated May 8, 2023 For PCT/DE2021/100858.
International Search Report and Written Opinion dated May 6, 2021 For PCT/DE2021/100035.
International Preliminary Report on Patentability dated Jul. 19, 2022 for Corresponding PCT Application No. PCT/DE2021/100035.
International Search Report and Written Opinion dated May 25, 2021 for PCT/DE2021/100136.
International Search Report and Written Opinion dated Apr. 8, 2021 for Corresponding Patent Application No. PCT/DE2020/101007.
International Preliminary Report on Patentability dated May 17, 2022 for Corresponding Patent Application No. PCT/DE2020/101007.
International Search Report and Written Opinion dated Jan. 26, 2021 for Corresponding Patent Application No. PCT/DE2020/100860.
International Preliminary Report on Patentability dated Apr. 12, 2022 for Corresponding Patent Application No. PCT/DE2020/100860.
Search Report dated Nov. 22, 2021 for Corresponding Patent Application No. DE 10 2021 105 560.1.
International Search Report and Written Opinion dated May 20, 2019 for Corresponding PCT Application No. PCT/DE2019/100249.
International Preliminary Report on Patentability dated Jan. 18, 2022 in Corresponding PCT Application No. PCT/DE2020/100478.

(56) References Cited

OTHER PUBLICATIONS

International Search Report and Written Opinion dated Sep. 16, 2020 in Corresponding PCT Application No. PCT/DE2020/100478.
Office Action dated Mar. 20, 2020 for Corresponding Patent Application No. DE 10 2019 119 040.1.
Office Action dated Feb. 19, 2020 for Corresponding Patent Application No. DE 10 2019 119 042.8.
International Preliminary Report on Patentability dated Jan. 18, 2022 in Corresponding PCT Application No. PCT/DE2020/100609.
International Search Report and Written Opinion dated Oct. 16, 2020 in Corresponding PCT Application No. PCT/DE2020/100609.
International Preliminary Report on Patentability dated Sep. 22, 2020 for Corresponding PCT Application No. PCT/DE2019/100249.
German Office Action dated Jul. 13, 2021 for Corresponding Patent Application No. DE 10 2020 127 638.9.
International Search Report and Written Opinion dated Feb. 4, 2022 for Corresponding PCT Application No. PCT/DE2021/100840.

\* cited by examiner

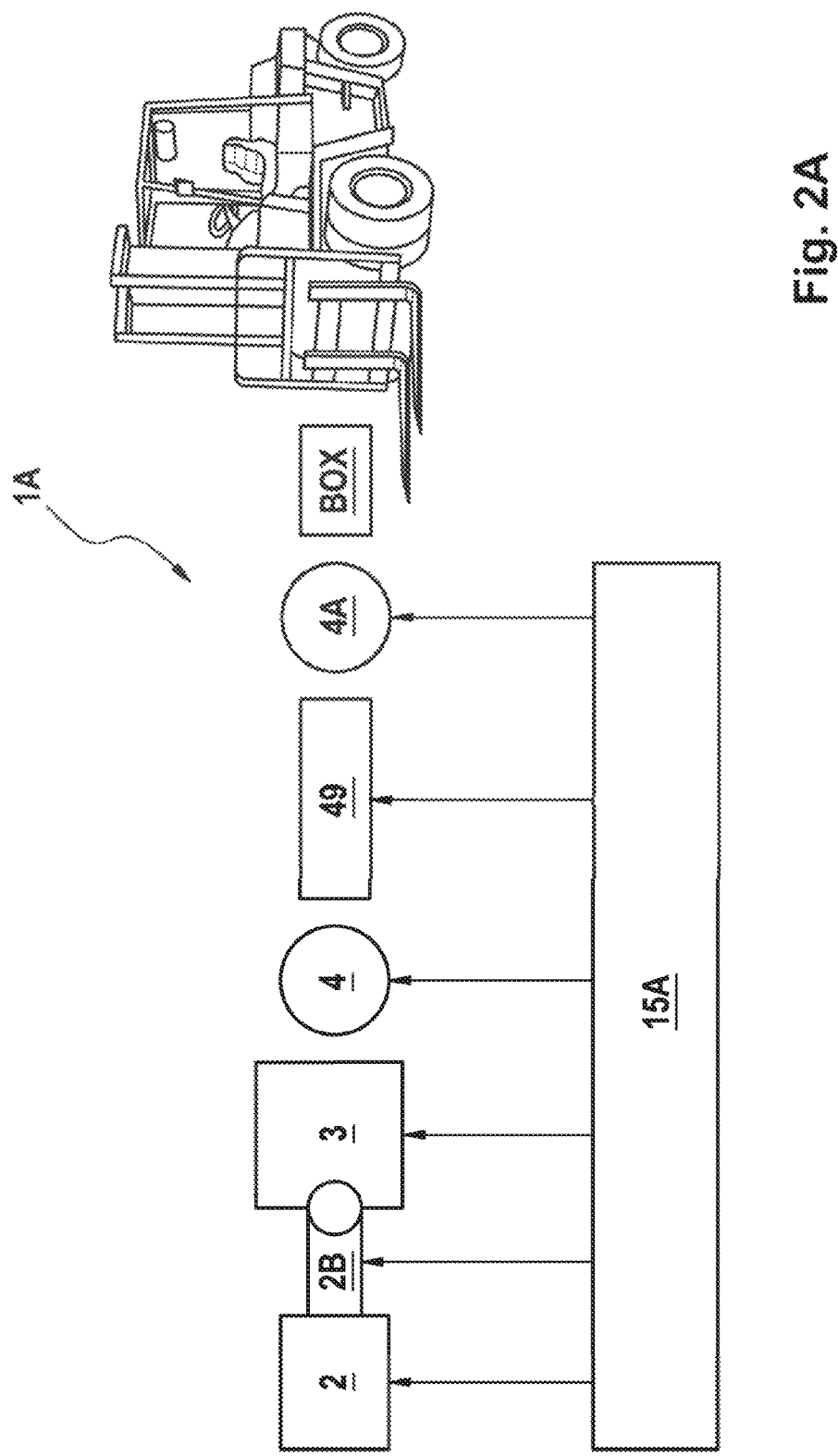

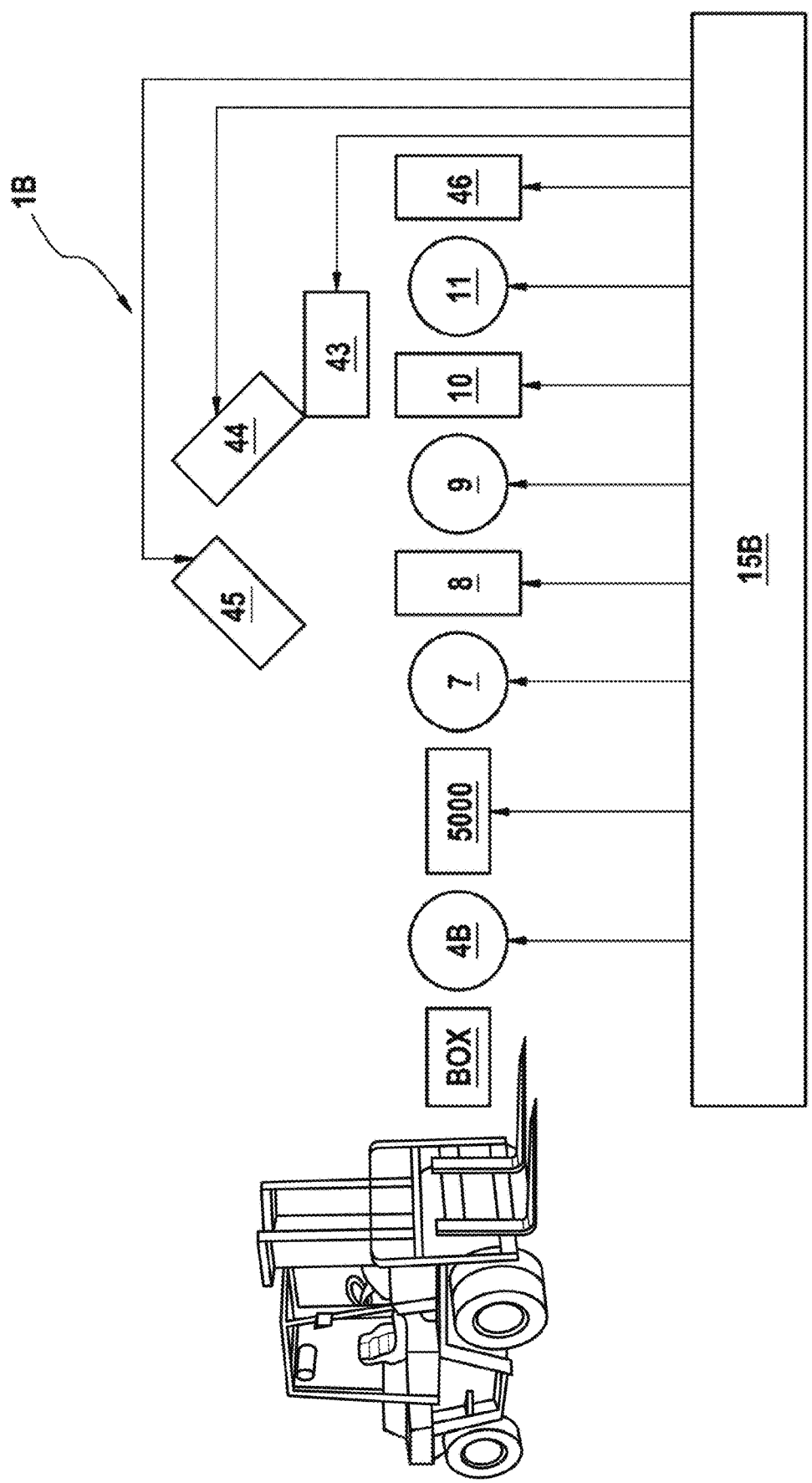

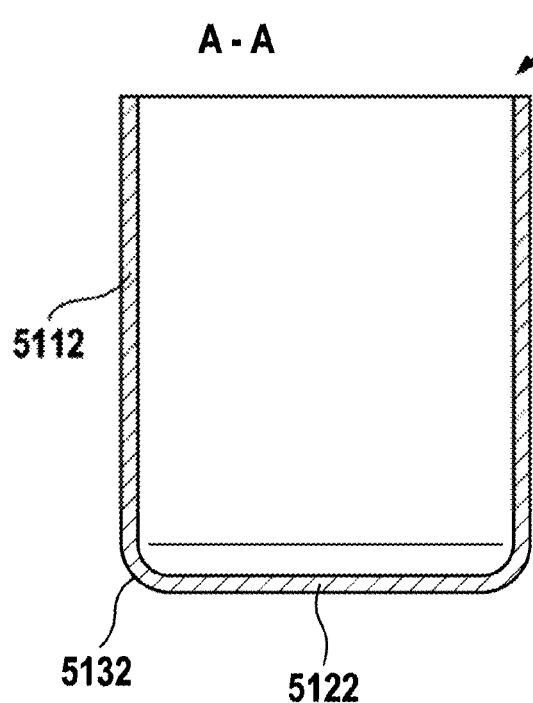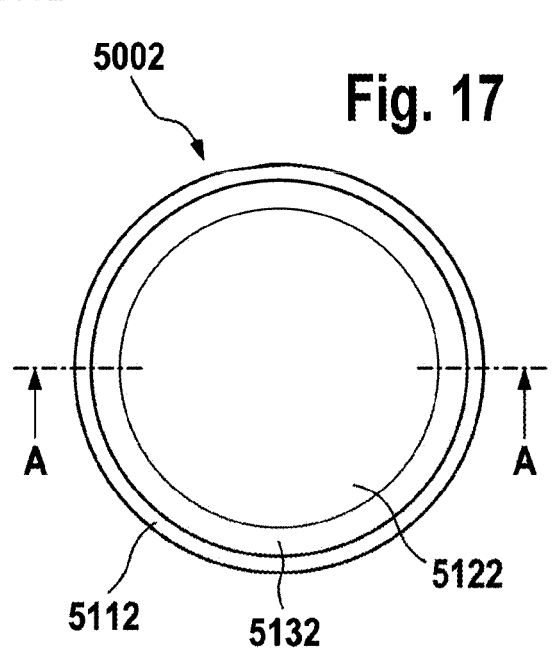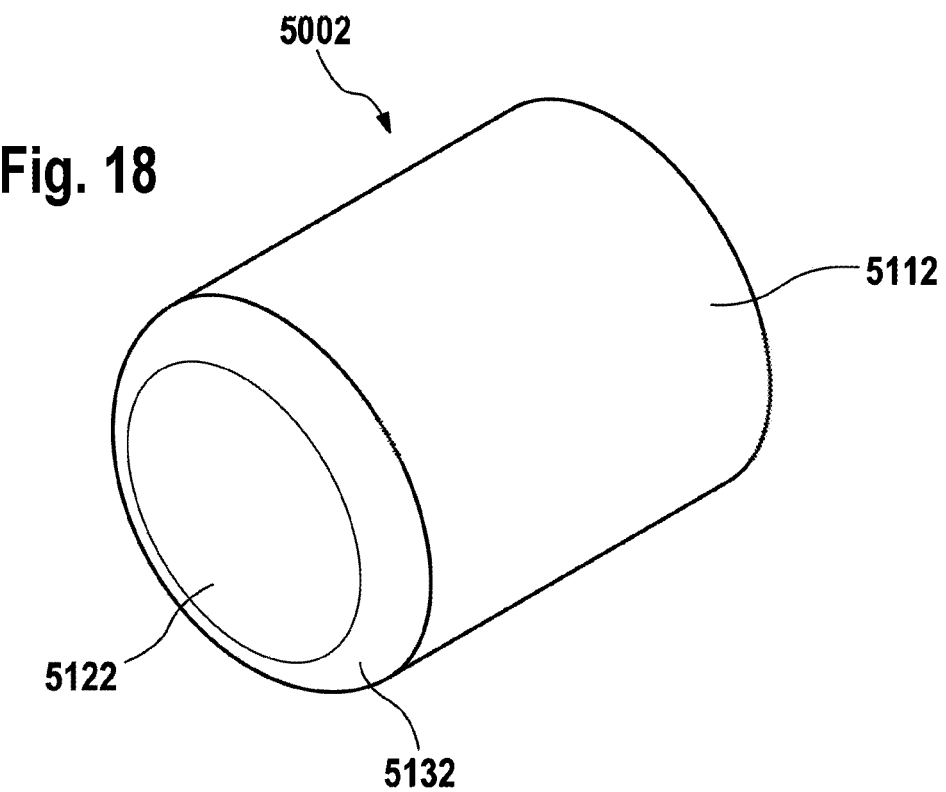

PROCESS FOR MANUFACTURING AN OPTICAL ELEMENT FROM GLASS

PRIORITY CLAIM

This application claims priority of the German patent application DE 10 2021 102 289.4, filed on Feb. 1, 2021, and of the German patent application DE 10 2022 101 728.1, which are explicitly incorporated herein by reference.

FIELD OF THE INVENTION

The disclosure concerns a process for press-molding an optical element or an (optical) lens from (inorganic) glass using a blank of (inorganic) glass.

BACKGROUND

EP 2 104 651 B1 discloses a method for producing headlight lenses for vehicle headlights, wherein a headlight lens comprises a lens body made of glass having a substantially planar surface and a convex curved surface, wherein a preform is press-molded between a lower mold for pressing the convex curved surface and an upper mold for pressing the substantially planar surface, which comprises a first partial mold and an annular second partial mold surrounding the first partial mold, to a headlight lens with a molded lens edge, wherein, by means of an offset between the second partial mold and the first partial mold, which is dependent on the volume of the preform, a step is pressed into the headlight lens, and wherein the first partial mold is set back from the second partial mold at least in the region of the offset.

SUMMARY

The disclosure concerns a process for manufacturing an optical element, for example an (optical) lens, for example a headlight lens, for example a vehicle headlight lens, from (inorganic) glass according to the claims. For example, it is provided that a blank of the (inorganic) glass is tempered, for example in such a way that the blank is cooler in its interior than on its exterior or in its edge region, wherein the tempered blank between a first mold and a second mold, which are moved towards one another to form a closed cavity, is press-molded, for example on both sides, to an optical element, wherein the first mold and/or the second mold comprises an escape cavity slide which is compressed by the formation of a closed cavity by means of the first mold and the second mold as a function of the volume of the blank, so that during press-molding an additional edge dependent on the volume of the blank is formed with the optical element. For example, the volume of the additional edge depends on the deviation of the volume of the blank from the target value of the volume of the blank.

BRIEF DESCRIPTION OF THE DRAWINGS

FIG. 2A shows a schematic view of a device for manufacturing gobs or optical elements from glass, FIG. 2B shows a schematic view of a device for manufacturing motor-vehicle headlight lenses or lens-like free-forms for motor-vehicle headlights or optical elements from glass, FIG. 16 shows a cross section through the protective cover according to FIG. 14, FIG. 17 shows a view into the interior of the protective cover according to FIG. 14, FIG. 18 shows a perspective view of the protective cover according to FIG. 14.

DETAILED DESCRIPTION

Figure 1:
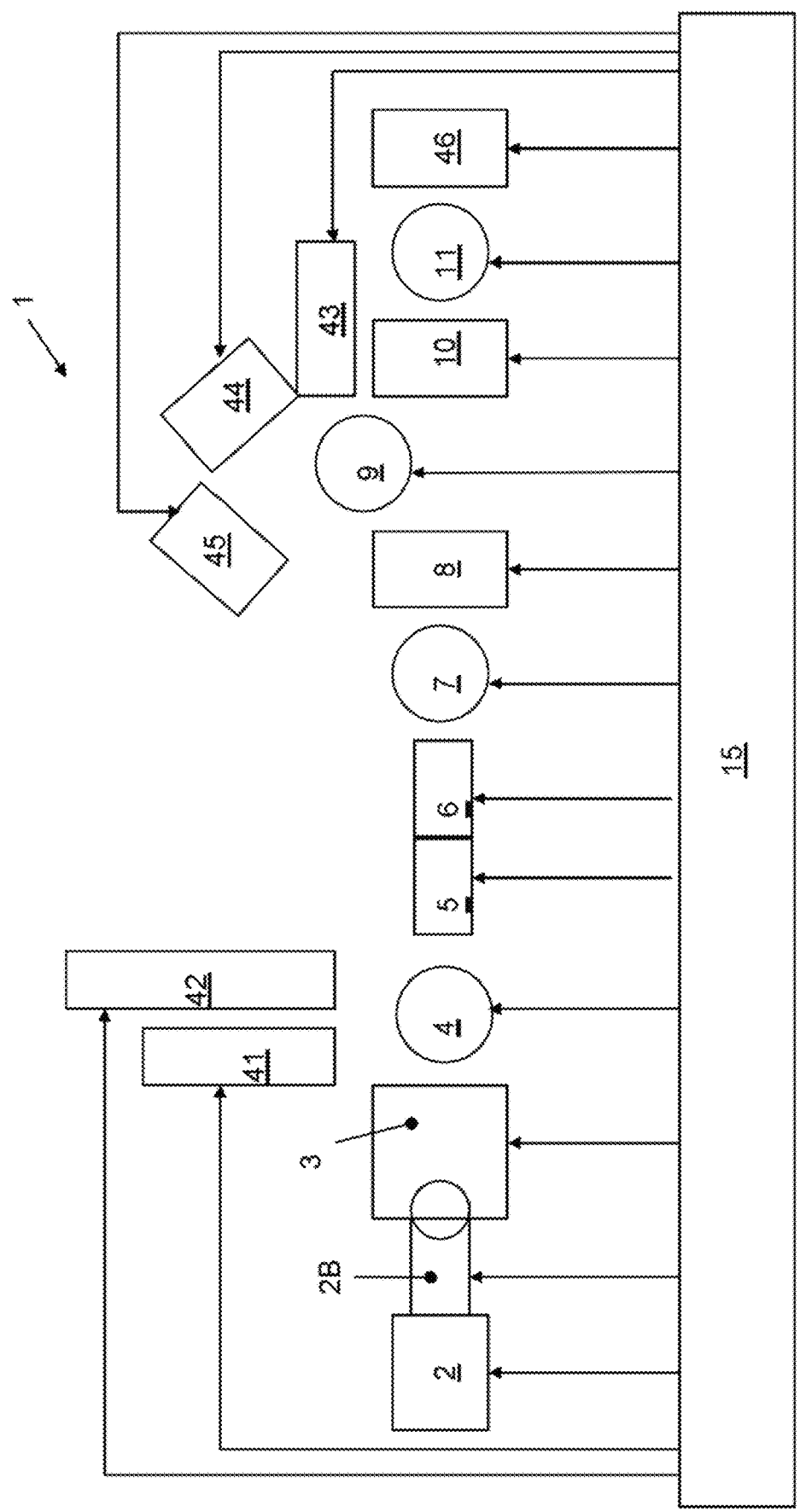
FIG. 1 shows a schematic view of a device for manufacturing motor-vehicle headlight lenses or lens-like free-forms for motor-vehicle headlights or optical elements from glass.

The disclosure concerns a process for manufacturing an optical element, for example an (optical) lens, for example a headlight lens, for example a vehicle headlight lens, from (inorganic) glass according to the claims. For example, it is provided that a blank of the (inorganic) glass is tempered, for example in such a way that the blank is cooler in its interior than on its exterior or in its edge region, wherein the tempered blank between a first mold and a second mold, which are moved towards one another to form a closed cavity, is press-molded, for example on both sides, to an optical element, wherein the first mold and/or the second mold comprises an escape cavity slide which is compressed by the formation of a closed cavity by means of the first mold and the second mold as a function of the volume of the blank, so that during press-molding an additional edge dependent on the volume of the blank is formed with the optical element. For example, the volume of the additional edge depends on the deviation of the volume of the blank from the target value of the volume of the blank. An edge area of a blank can be understood to mean, for example, the outer 10% or the outer 5% of the blank or its underside.

In one embodiment it is provided that by means of the first mold and/or the second mold a base edge is formed with the optical element during the press-molding, the volume of which is independent of the volume of the blank.

In a further embodiment it is provided that the optical element is cooled after the press-molding in a cooling path or according to a cooling regime (with addition of heat).

In a further embodiment it is provided that the escape cavity slide comprises a plunger and an elastic element mechanically coupled to the plunger. In a further embodiment it is provided that the elastic element is a spring. In a further embodiment it is provided that the escape cavity slide comprises a preloading mechanism for adjusting a preload on the elastic member. In a further embodiment it is provided that the elastic element or the escape cavity slide is preloaded.

In a further embodiment it is provided that the plunger and/or the escape cavity slide is displaceable no more than 1 mm, for example in a direction orthogonal to the pressing direction.

In a further embodiment it is provided that the additional edge is formed on the base edge such that it extends radially.

In a further embodiment it is provided that the additional edge is (spatially) separated from the base edge.

In a further embodiment it is provided that a first optically effective surface of the optical element is formed by means of the first mold. In a further embodiment of the invention, it is provided that a second optically active surface of the optical element is formed by means of the second mold.

For example, the distance between the first optically active surface and the second optically active surface is not subject to tolerances. For example, it is provided that the volume of the base edge is not subject to tolerances. For example, it is provided that the extension of the base edge in orientation of an optical axis of the optical element is not subject to tolerances. For example, it is provided that the extension of the base edge orthogonal to the orientation of an optical axis of the optical element is not subject to tolerances. For example, it is provided that the extension of the additional edge orthogonal to the pressing direction or orthogonal to the direction in which the first mold or the second mold is moved is subject to tolerance. Subject to tolerance in the sense of the present disclosure means that a tolerance is provided due to variations in the volume of the blanks. Not subject to tolerance in the sense of this disclosure means that no tolerance is provided due to variations in the volume of the blanks. However, not subject to tolerance in the sense of this disclosure does not exclude tolerances due to other manufacturing influences.

An optical surface or an optically effective surface in the sense of the present disclosure is for example a surface that lies in the desired light path through the optical element when used as intended.

The disclosure further concerns a process for manufacturing a batch of, for example at least sixteen or at least fifty-three, headlight lenses for a vehicle headlight, wherein the headlight lenses of the batch are manufactured according to an aforementioned method or according to the claims. In a further embodiment it is provided that the batch comprises at least five hundred headlight lenses. In a further embodiment it is provided that the extension of an additional edge in a direction orthogonal to the pressing direction of a headlight lens of the batch differs by more than 0.05 mm, advantageously by more than 0.1 mm, from the extension of an additional edge in a direction orthogonal to the pressing direction of a further headlight lens of the batch. In a further embodiment it is provided that the extension of an additional edge in a direction orthogonal to an optical axis of a headlight lens of the batch differs by more than 0.05 mm, advantageously by more than 0.1 mm, from the extension of an additional edge in a direction orthogonal to an optical axis of a further headlight lens of the batch. In a further embodiment it is provided that the radial extent of an additional edge of a headlight lens of the batch differs by more than 0.05 mm, advantageously by more than 0.1 mm, from the radial extent of an additional edge of a further headlight lens of the batch.

In a further embodiment, the (optical) lens has a convexly curved optically active surface and a planar surface. In a further embodiment, the lens has a first convexly curved optically active surface and a second convexly curved optically active surface, wherein the diameter of the first convexly curved optically active surface may be greater than the diameter of the second convexly curved optically active surface. It may be provided that the lens comprises an integrally formed base edge (having a volume). It may further be provided that a step is provided between the integrally formed base edge and the second optically effective surface. The step may be configured to taper toward the second optically effective convexly curved surface. The taper can be at a typical demolding angle. A suitable angle is greater than 3 degrees, for example.

In one embodiment, the blank is placed on an annular support surface of a support body with a hollow cross-section before pressing and heated to temper it on the support body. For example, the support surface is cooled by means of a cooling medium flowing through the support body.

In another embodiment, it is provided that the optical element is deposited on a transport element after the press-molding and passes through a cooling path with the transport element without touching an optical surface of the optical element.

A cooling path (for example for cooling optical elements) in the sense of this disclosure serves for example for the controlled cooling of the optical element (for example according to a cooling regime and/or with the addition of heat). Exemplary cooling regimes can be found, for example, in "Werkstoffkunde Glas", 1st edition, VEB Deutscher Verlag für Grundstoffindustrie, Leipzig VLN 152-915/55/75, LSV 3014, editorial deadline: Jan. 9, 1974, order number: 54107 for example page 130 and "Glastechnik—BG 1/1—Werkstoff Glas", VEB Deutscher Verlag für Grundstoffindustrie, Leipzig 1972, e.g. pages 59-65 (incorporated by reference in its entirety).

It may be provided that the first mold is a lower mold and the second mold is an upper mold. It may be provided that the first mold is an upper mold and the second mold is a lower mold. A mold in the sense of the present disclosure may also be multi-part. That is, a first mold and/or a second mold in terms of the present disclosure may comprise two or more partial molds.

In a further embodiment, the lower mold is moved by means of an actuator for moving the lower mold in that the lower mold and the actuator are connected by means of a first movable guide rod and at least one second movable guide rod, for example at least one third movable guide rod, wherein the first movable guide rod is guided in a (first) recess of a fixed guide element and the second movable guide rod is guided in a (second) recess of the fixed guide element and the optional third movable guide rod is guided in a (third) recess of the fixed guide element, wherein for example it is provided that the lower mold is connected by means of a movable connecting piece to the first movable guide rod and/or the second movable guide rod and/or the optional third movable guide rod, wherein for example it is provided that the deviation of the position of the lower mold orthogonal to the direction of movement of the lower mold is not more than 20 μm, for example not more than 15 μm, for example not more than 10 μm, from the target position of the lower mold orthogonal to the direction of movement of the lower mold.

In a further embodiment, the upper mold is moved by means of an actuator for moving the upper mold in a frame which comprises a first fixed guide rod, at least one second fixed guide rod and, for example, at least one third fixed guide rod, the first fixed guide rod, the at least second fixed guide rod and the optional at least third fixed guide rod being connected at one end by an actuator-side fixed connecting piece and at the other end by a mold-side fixed connecting piece, wherein at least the upper mold being fixed to a movable guide element, which has a (first) recess through which the first fixed guide rod is guided, a further (second) recess through which the at least second fixed guide rod is guided and optionally a further (third) recess through which the optionally third fixed guide rod is guided, wherein for example it is provided that the deviation of the position of the upper mold orthogonal to the direction of movement of the upper mold is not more than 20 μm, for example not more than 15 μm, for example not more than 10 μm, from the target position of the upper mold orthogonal to the direction of movement of the upper mold. At least the upper mold can be fixed to the moveable guide element by means of a mold receptacle. This may result in a distance between the upper mold and the movable guide element. In one embodiment, this distance is not greater than 150 mm, for example not greater than 100 mm, for example not greater than 50 mm.

In a further embodiment, it is provided for example that the lower mold is moved by means of an actuator for moving the lower mold in that the lower mold and the actuator for moving the lower mold are connected by means of a first movable guide rod and at least one second movable guide rod, for example at least one third movable guide rod, wherein the first movable guide rod is guided in a (first) recess of a fixed guide element and the second movable guide rod is guided in a (second) recess of the fixed guide element and the optional third movable guide rod is guided in a (third) recess of the fixed guide element, wherein it is provided for example that the lower mold is connected by means of a connecting piece to the first movable guide rod and/or the second movable guide rod and/or the optional third movable guide rod.

In a further embodiment the blank of glass is after heating and/or after being placed between the lower mold and at least the upper mold press-molded to the optical element, for example on both sides, in such a way that the deviation of the position of the lower mold and/or the upper mold orthogonal to the (target) pressing direction or (target) movement direction of the lower mold and/or the upper mold is not more than 20 μm, for example not more than 15 μm, for example not more than 10 μm, from the target position of the lower mold and/or the second upper mold orthogonal to the (target) direction of pressing or (target) direction of movement of the lower mold and/or the upper mold.

In a further embodiment, the blank of glass is after the heating and/or after being provided between the lower mold and at least the upper mold press-molded to the optical element, for example on both sides, in such a way that one or the angle between the target pressing direction of the lower mold and the actual pressing direction of the lower mold is not greater than $10^{-2}$°, for example not greater than $5 \cdot 10^{-3}$°.

In a further embodiment, the blank of glass is after the heating and/or after being provided between the lower mold and at least the upper mold press-molded to the optical element, for example on both sides, in such a way that one or the angle between the target pressing direction of the upper mold and the actual pressing direction of the upper mold is not greater than $10^{-2}$°, for example not greater than $5 \cdot 10^{-3}$°.

In a further embodiment, the blank of glass is after the heating and/or after being provided between the lower mold and at least the upper mold press-molded to the optical element, for example on both sides, in such a way that the first actuator is decoupled with respect to torsion from the mold-side moveable connecting piece and/or the lower mold (for example by means of a decoupling piece which comprises, for example, a ring and/or at least one first washer and optionally at least one second washer, it being possible to provide that the ring comprises the first and/or second washer).

In a further embodiment, the blank of glass is after the heating and/or after being provided between the lower mold and at least the upper mold press-molded to the optical element, for example on both sides, in such a way that the second actuator is decoupled with respect to torsion from the mold-side moveable connecting piece and/or the upper mold (for example by means of a decoupling piece which comprises, for example, a ring and/or at least one first washer and optionally at least one second washer, wherein it may be provided that the ring encompasses the first and/or second washer).

In a further embodiment, it is provided that the fixed guide element is identical to the mold-side fixed connecting piece or is indirectly or directly fixed thereto.

In another embodiment the maximum pressure with which the first mold and the second mold are pressed together is no less than 20,000 N.

In another embodiment the maximum pressure with which the first mold and the second mold are pressed together is no greater than 100,000 N.

In another embodiment the maximum pressure with which the first mold and the second mold are pressed together is no greater than 200,000 N.

In a further embodiment, the blank of glass is placed onto an for example annular support surface of a carrier body, for example having a hollow cross section, and is arranged on the carrier body in a cavity of a protective cover, which is arranged in a furnace cavity, and is for example heated such that a temperature gradient is produced in the blank such that the blank is cooler in its interior than in and/or on its outer region, wherein the blank of glass, after being heated, is press-molded, for example on both sides, to form the optical element.

In a further embodiment the protective cover is removably arranged in the furnace cavity.

In a further embodiment the protective cover is removed once a or the blank has burst in the furnace cavity, wherein e.g. another protective cover is arranged in the furnace cavity.

In one embodiment, the blank is moved into the cavity in the protective cover from above or from the side. In a further embodiment, however, the blank is moved into the cavity of the protective cover from below.

In a further embodiment, the furnace cavity comprises at least one heating coil, which surrounds the protective cover in the furnace cavity (at least) in part, wherein it is provided that the interior of the protective cover is heated by means of the at least one heating coil.

In a further embodiment the furnace cavity comprises at least two heating coils, which can be actuated separately from one another and surround the protective cover in the furnace cavity at least in part, wherein the interior of the protective cover is heated by means of the at least two heating coils.

In a further embodiment the protective cover is made of silicon carbide or at least comprises silicon carbide.

In a further embodiment the furnace cavity is part of a furnace assembly, for example in the form of a carousel, having a plurality of furnace cavities, in each of which a protective cover is arranged. Because the protective covers can be rapidly replaced when a blank has burst open, not only is the standstill time shortened, meaning that costs are reduced, but the quality of the optical component is also improved, since the fact that they can be rapidly replaced reduces any disruptive influences during heating or warming of the blanks. This effect can be further improved by the opening in the cavity of the protective cover, which points downwards, being closed or partially closed by a closure, wherein the closure can be detached and removed by loosening a fixing means, for example one or more screws. It is for example provided here that the protective cover falls out of the furnace cavity after detaching and removing the lower cover. This ensures that a furnace or hood-type annealing furnace is put back into operation rapidly.

In a further embodiment, the support surface is cooled by means of a coolant flowing through the carrier body. In a further embodiment the support surface spans a base surface that is not circular. In this case, a geometry of the support surface or a geometry of the base surface of the support surface is for example provided which corresponds to the geometry of the blank (to be heated), wherein the geometry is selected such that the blank rests on the outer region of its underside (underside base surface). The diameter of the underside or the underside base surface of the blank is at least 1 mm greater than the diameter of the base surface spanned (by the carrier body or its support surface). In this sense, it is for example provided that the geometry of the surface of the blank facing the carrier body or the underside base surface of the blank corresponds to the support surface or the base surface of the carrier body. This for example means that the part of the blank which is during the heating resting on the carrier body or contacting the carrier body after the forming process or the pressing or press-molding is arranged in a base edge of the headlight lens which lies outside the optical path and for example rests on a transport element (see below) or its (corresponding) support surface.

An annular support surface may comprise small discontinuities. Within the meaning of the disclosure, a base surface for example includes an imaginary surface (in the region of which the blank resting on the carrier body is not in contact with the carrier body), which lies in the plane of the support surface and is surrounded by this support surface, and the (actual) support surface. It is for example provided that the blank and the carrier body are coordinated with one another. This is for example is understood to mean that the blank on its underside rests with its edge region on the carrier body. An edge region of a blank can be understood to mean the outer 10% or the outer 5% of the blank or its underside, for example.

In a further embodiment, the base surface is polygon-shaped or polygonal, but for example with rounded corners, wherein it is for example provided that the underside base surface of the blank is also polygon-shaped or polygonal, but for example with rounded corners. In a further embodiment, the base surface is triangle-shaped or triangular, but for example with rounded corners, wherein it is for example provided that the underside base surface of the blank is also triangle-shaped or triangular, but for example with rounded corners. In one configuration, the base surface is rectangle-shaped or rectangular, but for example with rounded corners, wherein it is for example provided that the underside base surface of the blank is also rectangle-shaped or rectangular, but for example with rounded corners. In a further embodiment, the base surface is square, but for example with rounded corners, wherein it is for example provided that the underside base surface of the blank is also square, but for example with rounded corners. In a further embodiment, the base surface is oval, wherein it is for example provided that the underside base surface of the blank is also oval.

In a further embodiment, the carrier body is tubular at least in the region of the support surface. The carrier body e.g. consists (at least substantially) of steel or high-alloy steel (i.e. for example a steel in which the average mass content of at least one alloy element is ≥5%) or of a tube made of steel or high-alloy steel. In a further embodiment, the diameter of the hollow cross section of the carrier body or the internal tube diameter, at least in the region of the support surface, is no less than 0.5 mm and/or no greater than 1 mm. In a further embodiment, the external diameter of the carrier body or the external tube diameter, at least in the region of the support surface, is no less than 2 mm and/or no greater than 4 mm, for example no greater than 3 mm. In a further embodiment, the radius of curvature of the support surface orthogonally to the flow direction of the coolant is no less than 1 mm and/or no greater than 2 mm, for example no greater than 1.5 mm. In a further embodiment, the ratio of the diameter of the hollow cross section of the carrier body, at least in the region of the support surface, to the external diameter of the carrier body, at least in the region of the support surface, is no less than ¼ and/or no greater than ½. In a further embodiment, the carrier body is uncoated at least in the region of the support surface. In a further embodiment, coolant flows through the carrier body in accordance with the counterflow principle. In a further embodiment, the coolant is additionally and/or actively heated. In a further embodiment, the carrier body comprises at least two flow channels for the coolant flowing therethrough, which each only extend over a section of the annular support surface, wherein it is for example provided that two flow channels are connected in a region in which they leave the support surface by means of metal filler material, for example solder.

Within the meaning of the disclosure, a blank is for example a portioned glass part or a preform or a gob.

The process described may also be carried out in connection with pressing under vacuum or near vacuum or at least under negative pressure. Within the meaning of this disclosure, negative pressure is for example a pressure that is no greater than 0.5 bar, for example no greater than 0.3 bar, for example no less than 0.1 bar, for example no less than 0.2 bar. Within the meaning of this disclosure, vacuum or near vacuum is for example a pressure that is no greater than 0.1 bar, for example no greater than 0.01 bar, for example no greater than 0.001 bar. Within the meaning of this disclosure, vacuum or near vacuum is for example a pressure that is no less than 0.01 bar, for example no less than 0.001 bar, for example no less than 0.0001 bar. Suitable methods are for example disclosed in JP 2003-048728 A (incorporated by reference in its entirety) and in WO 2014/131426 A1 (incorporated by reference in its entirety). In a corresponding configuration, a bellows may be provided, as disclosed in WO 2014/131426 A1, at least in a similar manner. It may be provided that the pressing of the optical element is carried out in such a way by means of the lower mold and the upper mold, (a) wherein a heated blank made of transparent material is placed in or on the lower mold,
(b) wherein (subsequently or thereafter) the upper mold and the lower mold (are positioned relative to one another and) are moved towards one another without the upper mold and the lower mold forming a closed overall mold,
(c) wherein (subsequently or thereafter) a seal for producing an airtight space, in which the lower mold and the upper mold are arranged, is closed,
(d) wherein (subsequently or thereafter) a negative pressure or near vacuum or vacuum is generated in the airtight space,
(e) and wherein (subsequently or thereafter) the upper mold and the lower mold are moved towards one another (for example vertically) for (press-)molding the optical (lens) element (for example on both sides or all sides), wherein it is for example provided that the upper mold and the lower mold form a closed overall mold.

The upper mold and the lower mold can be moved towards one another by the upper mold being moved towards the lower mold and/or the lower mold being (vertically) moved towards the upper mold.

For pressing, the upper mold and the lower mold are for example moved towards one another until they come into contact and/or form a closed overall mold.

In a further embodiment, in step (b) the upper mold and the lower mold are for example moved towards together so far that the distance (for example the vertical distance) between the upper mold and the blank is no less than 4 mm and/or no greater than 10 mm.

In a further embodiment, a bellows is arranged between the movable connecting piece of the lower mold and the movable guide element of the upper mold such that a negative pressure or near vacuum or vacuum can be generated in the space enclosed by the bellows, and therefore the blank is pressed under negative pressure or near vacuum or vacuum. Alternatively, a chamber may also be provided which surrounds the lower mold, the upper mold and the blank such that the blank is pressed under negative pressure or near vacuum or vacuum.

In a further embodiment,
(f) (following step (e) or after step (e)) normal pressure is generated in the airtight space. Within the meaning of the disclosure, normal pressure is for example atmospheric (air) pressure. Within the meaning of the disclosure, normal pressure is for example the pressure or air pressure prevailing outside the seal. Subsequently or thereafter, in a further embodiment, the seal is opened or returned to its starting position.

In a further embodiment,
(g) (following step (f) or after step (f) or during step (f)) the upper mold and the lower mold are moved away from one another. The upper mold and the lower mold can be moved away from one another by the upper mold being moved away from the lower mold and/or the lower mold being moved away from the upper mold. Subsequently or thereafter according to a further embodiment the optical element is removed. Subsequently or thereafter, according to a further embodiment the optical element is cooled in accordance with a predetermined cooling regime (see below).

In a further embodiment before pressing the optical (lens) element (or between step (d) and step (e)), a predetermined waiting time is allowed to elapse. In a further embodiment the predetermined waiting time is no greater than 3 seconds (minus the duration of step (d)). In a further embodiment, the predetermined waiting time is no less than 1 second (minus the duration of step (d)).

The transport element or the corresponding support surface of the transport element is for example annular, but for example is not circular. In an illustrative embodiment, the corresponding support surface surrounds a recess having a passage surface, which is for example the surface formed by the recess in a plan view of the transport element. The geometric shape of the passage surface for example approximately or substantially corresponds to the geometric shape of the base surface. In one configuration, the passage surface is polygon-shaped or polygonal, but for example with rounded corners. In another configuration, the base surface is triangle-shaped or triangular, but for example with rounded corners. In another configuration of the disclosure, the base surface is rectangle-shaped or rectangular, but for example with rounded corners. In another configuration, the base surface is square, but for example with rounded corners. In another configuration, the base surface is oval.

The disclosure also relates to a batch of, for example at least sixteen or at least fifty-three or at least five hundred, headlamp lenses for vehicle headlamps which are press-molded from glass and have an integrally formed base edge, the headlamp lenses of the batch each comprising a first, for example essentially planar, optically active surface and each comprising at least one second, for example convexly curved, optically active surface, the headlamp lenses comprising an additional edge which is independent of the base edge, wherein

- the extension of the additional edge in a direction orthogonal to an optical axis of a headlight lens of the batch differs by more than 0.05 mm, advantageously by more than 0.1 mm, from the extension of an additional edge in a direction orthogonal to an optical axis of a further headlight lens of the batch and/or
- the radial extension of the additional edge of a headlight lens of the batch differs by more than 0.05 mm, advantageously by more than 0.1 mm, from the radial extension of the additional edge of a further headlight lens of the batch For example, it is intended that the geometry or the contour of the base edges of the headlight lenses of the batch does not differ.

Glass within the meaning of the present disclosure is for example inorganic glass. Glass within the meaning of the present disclosure is for example silicate glass. Glass within the meaning of the present disclosure is, for example glass as described in WO 2009/109209 A1. Within the meaning of the disclosure, glass for example comprises 0.2 to 2 wt. % $Al_2O_3$,
0.1 to 1 wt. % $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO,
such as DOCTAN®.

In addition to particular contour accuracy and precise optical properties being required, the desire has developed for molding headlight lenses from borosilicate glass or glass systems similar to borosilicate glass, in order to obtain increased weather resistance and/or hydrolytic resistance (chemical resistance). Standards or evaluations methods for hydrolytic resistance (chemical resistance) are the Hella N67057 standard test and the climatic test/humidity-frost test, for example. High hydrolytic resistance is also classified as type 1, for example. In the light of the requirement for borosilicate-glass headlight lenses having corresponding hydrolytic resistance, the problem is posed of pressing headlight lenses from borosilicate glass or similar glass systems having the same hydrolytic resistance (chemical resistance). In a departure from this problem, an alternative method for producing an optical element or headlight lens is proposed, wherein a blank made of non-borosilicate glass and/or soda-lime glass (soda lime silica glass) is heated and/or provided and, after being heated and/or provided, is press-molded, for example on both sides, between a lower mold, for example for molding and/or press-molding a first optically active surface of the optical element, and at least an upper mold, for example for molding and/or press-molding a second optically active surface of the optical element, to form the optical element, wherein the first optically active surface and/or the second optically active surface is sprayed with a surface-treatment agent (after the pressing). Within the meaning of this disclosure, spraying for example comprises fogging, misting and/or (the use of) spray mist. Within the meaning of this disclosure, spraying for example means fogging, misting and/or (the use of) spray mist.

Within the meaning of this disclosure, soda-lime glass for example comprises
60 to 75 wt. % $SiO_2$ and
3 to 12 wt. % CaO,
or
70 to 75 wt. % $SiO_2$ and
3 to 12 wt. % CaO.

Within the meaning of this disclosure, soda-lime glass for example comprises
60 to 75 wt. % $SiO_2$,
3 to 12 wt. % $K_2O$ and
3 to 12 wt. % CaO,
or
70 to 75 wt. % $SiO_2$,
3 to 12 wt. % $K_2O$ and
3 to 12 wt. % CaO.

Within the meaning of this disclosure, soda-lime glass for example comprises
60 to 75 wt. % $SiO_2$,
3 to 12 wt. % $Na_2O$,
3 to 12 wt. % $K_2O$ and
3 to 12 wt. % CaO,
or
70 to 75 wt. % $SiO_2$,
3 to 12 wt. % $Na_2O$,
3 to 12 wt. % $K_2O$ and
3 to 12 wt. % CaO.

Within the meaning of this disclosure, soda-lime glass for example comprises
0.2 to 2 wt. % $Al_2O_3$,
60 to 75 wt. % $SiO_2$,
3 to 12 wt. % $Na_2O$,
3 to 12 wt. % $K_2O$ and
3 to 12 wt. % CaO, Within the meaning of this disclosure, soda-lime glass for example comprises
0.2 to 2 wt. % $Al_2O_3$,
0.1 to 1 wt. % $Li_2O$,
60 to 75 wt. % $SiO_2$,
3 to 12 wt. % $Na_2O$,
3 to 12 wt. % $K_2O$ and
3 to 12 wt. % CaO,
or
0.2 to 2 wt. % $Al_2O_3$,
0.1 to 1 wt. % $Li_2O$,
70 to 75 wt. % $SiO_2$,
3 to 12 wt. % $Na_2O$,
3 to 12 wt. % $K_2O$ and
3 to 12 wt. % CaO, Within the meaning of this disclosure, soda-lime glass for example comprises
0.2 to 2 wt. % $Al_2O_3$,
0.1 to 1 wt. % $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO,
such as DOCTAN®, or
0.2 to 2 wt. % $Al_2O_3$,
0.1 to 1 wt. % $Li_2O$,
0.3, for example 0.4, to 1.5 wt. % $Sb_2O_3$,
70 to 75 wt. % $SiO_2$, 3 to 12 wt. % $Na_2O$,
3 to 12 wt. % $K_2O$ and
3 to 12 wt. % $CaO$.

The surface-treatment agent for example comprises $AlCl_3 \cdot 6H_2O$ (dissolved in a solvent and/or $H_2O$), wherein suitable mixture ratios can be found in DE 103 19 708 A1 (e.g. FIG. 1). For example, at least 0.5 g, for example at least 1 g, $AlCl_3 \cdot 6H_2O$ is provided per liter $H_2O$.

In a further embodiment the first optically active surface and the second optically active surface are sprayed with the surface-treatment agent at least partially simultaneously (overlapping in time).

In a further embodiment, the temperature of the optical element and/or the temperature of the first optically active surface and/or the temperature of the second optically active surface during spraying with surface-treatment agent is no less than $T_G$ or $T_G+20$ K, wherein $T_G$ denotes the glass transition temperature.

In a further embodiment, the temperature of the optical element and/or the temperature of the first optically active surface and/or the temperature of the second optically active surface during spraying with surface-treatment agent is no greater than $T_G+100$ K.

In a further embodiment, the surface-treatment agent in the form of a spray agent is sprayed onto the optically active surface, wherein the surface-treatment agent forms droplets, of which the size and/or the average size and/or the diameter and/or the average diameter is no greater than 50 μm.

In a further embodiment, the surface-treatment agent in the form of a spray agent is sprayed onto the optically active surface, wherein the surface-treatment agent forms droplets, of which the size and/or the average size and/or the diameter and/or the average diameter is no less than 10 μm.

In a further embodiment, the surface-treatment agent is sprayed so as to be mixed with compressed air. In a further embodiment, compressed air, for example in combination with a mixing nozzle or dual-substance nozzle, is used for generating a spray mist for the surface-treatment agent.

In a further embodiment, the optically active surface is sprayed with the surface-treatment agent before the optical element is cooled in a cooling line for cooling in accordance with a cooling regime.

In a further embodiment, an optically active surface is sprayed with the surface-treatment agent for no longer than 4 seconds. Here, an optically active surface is sprayed with the surface-treatment agent for example for no longer than 12 seconds, for example for no longer than 8 seconds, for example for no less than 2 seconds. In this process, the optically active surface is for example sprayed until it has been sprayed with no less than 0.05 ml surface-treatment agent and/or with no more than 0.5 ml, for example 0.2 ml, surface-treatment agent.

It is for example provided that the headlamp lens consists of at least 90% quartz glass, for example at least 95%, for example (substantially) 100% quartz glass on the surface after spraying with the surface treatment agent. It is for example provided that the following is applicable in relation to the oxygen bonding to silicon on the surface of the headlight lens or the optical element $$\frac{Q(4)}{Q(4)+Q(3)} \geq 0.9$$

for example $$\frac{Q(4)}{Q(4)+Q(3)} \geq 0.95$$

In the above, Q(3) or Q(4) denote the crosslinking of the oxygen ions with the silicon ion, wherein 3 oxygen ions (Q(3)) or 4 oxygen ions (Q(4)) are arranged at the tetrahedron corners of the silicon ion. The proportion of quartz glass decreases towards the interior of the headlight lens or optical element, wherein, at a depth (distance from the surface) of 5 μm, it is for example provided that the proportion of quartz glass is at least 10%, for example at least 5%. It is for example provided that the following is applicable with regard to the oxygen bonding to silicon of the headlight lens or the optical element at a depth of 5 μm $$\frac{Q(4)}{Q(4)+Q(3)} \geq 0.1$$

for example $$\frac{Q(4)}{Q(4)+Q(3)} \geq 0.05$$

It is for example provided that the proportion of quartz glass at a depth (distance from the surface) of 5 μm is no greater than 50%, for example no greater than 25%. It is for example provided that the following is applicable with regard to the oxygen bonding to silicon of the headlight lens or the optical element at a depth of 5 μm $$\frac{Q(4)}{Q(4)+Q(3)} \leq 0.5$$

for example $$\frac{Q(4)}{Q(4)+Q(3)} \leq 0.25$$

Within the meaning of the disclosure, an optical element is for example a lens, for example a headlight lens or a lens-like free-form. Within the meaning of the disclosure, an optical element is for example a lens or a lens-like free-form comprising a supporting edge that is circumferential, discontinuous or circumferential in a discontinuous manner. In a further embodiment, it is provided that, after press-molding, the optical element is placed on a transport element, is sprayed with surface-treatment agent on the transport element and, thereafter or subsequently, passes through a or the cooling path on the transport element without an optical surface of the optical element being contacted (see above). It is necessary to comply with a cooling regime of this kind in order to prevent any internal stresses within the optical element or the headlight lens, which, although they are not visible upon visual inspection, can sometimes significantly impair the lighting properties as an optical element of a headlight lens. These impairments can result in a corresponding optical element or headlight lens becoming unusable. It has surprisingly been found that, although the claimed spraying of the hot optical element or headlight lens after press-molding or after removal from the mold following the press-molding changes the cooling regime, the resulting optical stresses are negligible. It is also surprising that a corresponding headlight lens ranges between the above-mentioned optical tolerances in relation to its optical property, although the refractive index is reduced by the proportion of quartz glass on the surface.

In a further embodiment, the transport element consists of steel. For clarification: the transport element is not part of the optical element (or headlight lens), and the optical element (or headlight lens) and the transport element are not part of a common, integral body.

In a further embodiment, the transport element is heated, for example inductively, before receiving the optical element. In a further embodiment, the transport element is heated at a heating rate of at least 20 K/s, for example of at least 30 K/s. In a further embodiment, the transport element is heated at a heating rate of no greater than 50 K/s. In a further embodiment, the transport element is heated by means of a current-carrying winding/coil which is arranged above the transport element.

In a further embodiment, the optical element comprises a support surface, which lies outside the light path provided for the optical element, wherein the support surface, for example only the support surface, is in contact with a corresponding support surface of the transport element when the optical element is placed on the transport element. In a further embodiment, the support surface of the optical element is on the edge of the optical element. In a further embodiment, the transport element comprises at least one limiting surface for orienting the optical element on the transport element and for limiting or preventing a movement of the optical element on the transport element. In one configuration, the limiting surface or surfaces are provided above the corresponding support surface of the transport element. In another configuration, (at least) two limiting surfaces are provided, wherein it may be provided that one limiting surface is below the corresponding support surface of the transport element and one limiting surface is above the corresponding support surface of the transport element. In a further embodiment, the transport element is adapted, i.e. manufactured, for example milled, to the optical element or the support surface of the optical element.

The transport element or the support surface of the transport element is for example annular, but is for example not circular.

In a further embodiment, the preform is produced, cast and/or molded from molten glass. In a further embodiment, the mass of the preform is 10 g to 400 g, for example 20 g to 250 g.

In a further embodiment, the temperature gradient of the preform is set such that the temperature of the core of the preform is above 10 K+$T_G$.

In a further embodiment, to reverse its temperature gradient, the preform is first cooled, for example with the addition of heat, and then heated, wherein it is advantageously provided that the preform is heated such that the temperature of the surface of the preform after heating is at least 100 K, for example at least 150 K, higher than the glass transition temperature $T_G$. The glass transition temperature $T_G$ is the temperature at which the glass becomes hard. Within the meaning of the disclosure, the glass transition temperature $T_G$ is for example intended to be the temperature of the glass at which it has a viscosity log in a range around 13.2 (corresponding to $10^{13.2}$ Pas), for example between 13 (corresponding to $10^{13}$ Pas) and 14.5 (corresponding to $10^{14.5}$ Pas). In relation to the glass type B270, the transition temperature $T_G$ is approximately 530° C.

In a further embodiment, the temperature gradient of the preform is set such that the temperature of the upper surface of the preform is at least 30 K, for example at least 50 K, above the temperature of the lower surface of the preform. In a further embodiment, the temperature gradient of the preform is set such that the temperature of the core of the preform is at least 50 K below the temperature of the surface of the preform. In a further embodiment, the preform is cooled such that temperature of the preform before the heating is $T_G$−80 K to $T_G$+30 K. In a further embodiment, the temperature gradient of the preform is set such that the temperature of the core of the preform is 450° C. to 550° C. The temperature gradient is set such that the temperature in the core of the preform is below $T_G$ or close to $T_G$. In a further embodiment, the temperature gradient of the preform is set such that the temperature of the surface of the preform is 700° C. to 900° C., for example 750° C. to 850° C. In a further embodiment, the preform is heated such that its surface assumes a temperature (for example immediately before pressing) that corresponds to the temperature at which the glass of the preform has a viscosity log between 5 (corresponding to $10^5$ Pas) and 8 Pas (corresponding to $10^8$ Pas), for example a viscosity log between 5.5 (corresponding to $10^{5.5}$ Pas) and 7 (corresponding to $10^7$ Pas).

It is for example provided that, before reversing the temperature gradient, the preform is removed from a mold for molding or producing the preform. It is for example provided that the temperature gradient is reversed outside a mold. Within the meaning of the disclosure, cooling with the addition of heat for example means that cooling is carried out a temperature of greater than 100° C.

Furthermore, the present disclosure concerns a device for carrying out the above-mentioned processes.

Within the meaning of the disclosure, press-molding is for example understood to mean pressing an (for example optically active) surface such that subsequent finishing of the contour of this (for example optically active) surface is or can be omitted or is not provided. It is thus for example provided that a press-molded surface is not polished after the press-molding. Polishing, which influences the surface finish but not the contours of the surface, may be provided in some cases. Press-molding on both sides can for example be understood to mean that an (for example optically active) light exit surface is press-molded and an (for example optically active) light entry surface that is for example opposite the (for example optically active) light exit surface is likewise press-molded.

Within the meaning of this disclosure, press-molding solely relates to (optically active) surfaces that are used for influencing light in a targeted manner. Within the meaning of this disclosure, molding therefore does not relate to pressing of surfaces that are not used for influencing light passing therethrough in a targeted and/or intended manner. This means that, for the use of the term "press-molding" within the meaning of the claims, it is unimportant whether or not the surfaces that are not used for optically influencing light or for influencing light according to the use are finished.

In one configuration, the blank is placed onto an annular support surface of a carrier body having a hollow cross section, and is heated on the carrier body for example such that a temperature gradient is produced in the blank such that the blank is cooler in its interior than on its outer region, wherein the support surface is cooled by means of a coolant flowing through the carrier body, wherein the blank made of glass, after being heated, is press-molded, for example on both sides, to form the optical element, wherein the carrier body comprises at least two flow channels for the coolant flowing therethrough, which each only extend over a section of the annular support surface, and wherein two flow channels are connected in a region in which they leave the support surface by means of metal filler material, for example solder.

Within the meaning of this disclosure, a guide rod may be a rod, a tube, a profile, or the like.

Within the meaning of this disclosure, fixed for example means directly or indirectly fixed to a base of the pressing station or the press or a base on which the pressing station or press stands. Within the meaning of this disclosure, two elements are for example then fixed to one another when it is not provided that they are moved relative to one another for pressing.

For pressing, the lower mold and the upper mold are for example moved towards one another such that they form a closed mold or cavity or a substantially closed mold or cavity. Moving towards each other in the sense of this disclosure means, for example, that both molds, i.e., both the lower mold and the upper mold, are moved. However, it can also mean that only one of the two molds is moved, i.e. either the lower mold or the upper mold.

Within the meaning of the disclosure, a recess for example includes a bearing that couples or connects the recess to the corresponding guide rod. Within the meaning of this disclosure, a recess may be widened to form a sleeve or may be designed as a sleeve. Within the meaning of this disclosure, a recess may be widened to form a sleeve comprising an inner bearing or may be designed as a sleeve comprising an inner bearing.

In a matrix headlight, the optical element or a corresponding headlight lens is for example used as light-shaping optics and/or as a secondary lens for imaging a or the light-shaping optics. Within the meaning of this disclosure, light-shaping optics are for example arranged between the secondary optics and a light-source assembly. Within the meaning of this disclosure, light-shaping optics are for example arranged in the light path between the secondary optics and the light-source assembly. Within the meaning of this disclosure, light-shaping optics are for example an optical component for forming a light distribution depending on light that is generated by the light-source assembly and is directed therefrom into the light-shaping optics. Here, a light distribution is generated or formed for example by TIR, i.e. by total reflection.

The optical element or a corresponding lens is also used in a projection headlight, for example. In the configuration as a headlight lens for a projection headlight, the optical element or a corresponding lens forms the edge of a shield in the form of a bright-dark-boundary on the carriageway.

Furthermore, the present disclosure concerns a method for producing a vehicle headlight, wherein an optical element manufactured according to a process having one or more of the above-mentioned features is installed in a headlight housing.

Furthermore, the present disclosure concerns a method for producing a vehicle headlight, wherein an optical element manufactured according to a process having one or more of the above-mentioned features is placed in a headlight housing and is installed together with at least one light source or a plurality of light sources to form a vehicle headlight.

Furthermore, the present disclosure concerns a method for producing a vehicle headlight, wherein an optical element manufactured according to a process having one or more of the above-mentioned features is installed (in a headlight housing) together with at least one light source and a shield to form a vehicle headlight such that an edge of the shield can be imaged by the (automotive) lens element as a bright-dark-boundary by means of light emitted by the light source.

Furthermore the present disclosure concerns a method for producing a vehicle headlight, wherein an optical element manufactured according to a process having one or more of the above-mentioned features is placed in a headlight housing in the form of secondary optics or as part of secondary optics comprising a plurality of lenses for imaging a light output surface of light-shaping optics and/or an illumination pattern generated by means of primary optics and is installed together with at least one light source or a plurality of light sources and the light-shaping optics to form a vehicle headlight.

Furthermore, the present disclosure concerns a method for producing a vehicle headlight, wherein a primary optics or a shaping-optics optics array as primary optics is produced for generating the illumination pattern according to a process having one or more of the above-mentioned features.

Furthermore, the present disclosure concerns a method for producing a vehicle headlight, wherein the primary optics comprise a system of movable micromirrors, for example a system of more than 100,000 movable micromirrors, for example a system of more than 1,000,000 movable micromirrors, for generating the illumination pattern.

Furthermore, the present disclosure concerns a method for producing an objective lens, wherein at least one first lens is manufactured according to a process having one or more of the above-mentioned features and is then installed in an objective lens and/or an objective housing. In a further embodiment, at least one second lens is manufactured according to a process having one or more of the above-mentioned features and is then installed in an objective lens and/or an objective housing. In a further embodiment, at least one third lens is manufactured according to a process having one or more of the above-mentioned features and is then installed in an objective lens and/or an objective housing. In a further embodiment, at least one fourth lens is manufactured according to a process having one or more of the above-mentioned features and is then installed in an objective lens and/or an objective housing.

Furthermore, the present disclosure concerns a method for producing a camera, wherein an objective lens manufactured according to a process having one or more of the above-mentioned features is installed together with a sensor or light-sensitive sensor such that an object can be imaged on the sensor by means of the objective lens. The above-mentioned objective lens and/or the above-mentioned camera can be used as a sensor system or a surround sensor system for use for vehicle headlights, such as the above-mentioned vehicle headlights, and/or in driver assistance systems.

In a further embodiment it is provided that the maximum deviation of the actual value from the target value of the distance between two optically active surfaces of the optical element is no greater than 40 μm, for example no greater than 30 μm, for example no greater than 20 μm, for example no less than 2 μm. In a further embodiment it is provided that the maximum deviation of the actual value from the target value of the distance between an optically active surface and a plane orthogonal to the optical axis of the optically active surface, wherein this plane includes the geometric centroid of the optical element, is no greater than 20 μm, for example no greater than 15 μm, for example no greater than 8 μm, for example no less than 1 μm. In a further embodiment it is provided that the RMSt value (total surface form deviation) according to DIN ISO 10110-5 of April 2016 for the optically active surfaces of the optical element, for at least one optically active surface of the optical element and/or for at least two optically active surfaces of the optical element, is no greater than 12 μm, for example no greater than 10 μm, for example no greater than 8 μm, for example no greater than 6 μm, for example no greater than 4 μm, for example no greater than 2 μm, for example no less than 0.5 μm.

Within the meaning of the disclosure, a motor vehicle is for example a land vehicle that can be used individually in road traffic. Within the meaning of the disclosure, motor vehicles are for example not limited to land vehicles comprising internal combustion engines.

FIG. 1 and FIGS. 2A and 2B show a schematically shown device 1 or 1A and 1B for carrying out a process shown in FIG. 3 or 4 for manufacturing optical elements, for example optical lenses, such as motor-vehicle headlight lenses, such as the (motor-vehicle) headlight lens 202 shown schematically in FIG. 33, or (lens-like) free-forms, for example for motor-vehicle headlights, for example the use thereof as described in the following with reference to FIG. 33.

Figure 33:
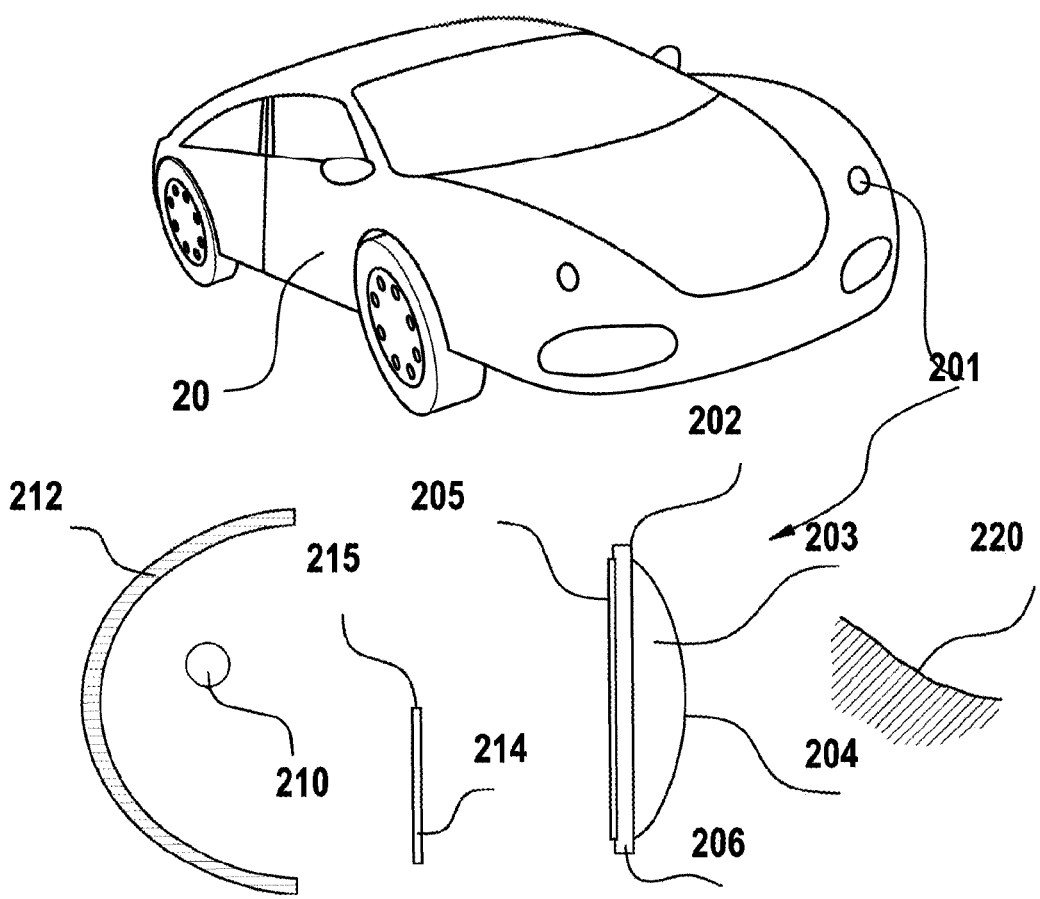
FIG. 33 shows a schematic view of a motor-vehicle headlight.

FIG. 33 is a schematic view of a motor-vehicle headlight 201 (projection headlight) of a motor vehicle 20, comprising a light source 210 for generating light, a reflector 212 for reflecting light that can be generated by means of the light source 210, and a shield 214. The motor-vehicle headlight 201 also comprises a headlight lens 202 for imaging an edge 215 of the shield 214 as a bright-dark-boundary 220 by means of light that can be generated by the light source 210. Typical requirements placed on the bright-dark-boundary or on the light distribution taking into account or incorporating the bright-dark-boundary are disclosed e.g. in Bosch—Automotive Handbook, $9^{th}$ edition, ISBN 978-1-119-03294-6, page 1040. Within the meaning of the disclosure, a headlight lens is e.g. a headlight lens by means of which a bright-dark-boundary can be generated, and/or a headlight lens by means of which the requirements according to Bosch—Automotive Handbook, $9^{th}$ edition, ISBN 978-1-119-03294-6 (incorporated by reference in its entirety), page 1040, can be met. The headlight lens 202 comprises a lens body 203 made of glass, which has a substantially planar (for example optically active) surface 205 facing the light source 210 and a substantially convex (for example optically active) surface 204 facing away from the light source 210. The headlight lens 202 also comprises an (for example circumferential) base edge 206, by means of which the headlight lens 202 can be fastened in the motor-vehicle headlight 201. The elements in FIG. 33 are not necessarily shown to scale for the sake of simplicity and clarity. Therefore, for example, the scales of some elements are exaggerated compared with other elements in order to improve the understanding of the embodiment of the present disclosure.

Figure 34:
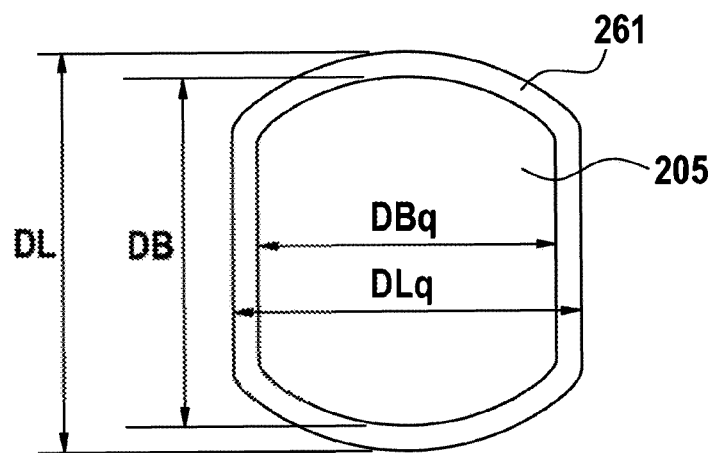
FIG. 34 shows a view of a headlight lens according to FIG. 33 from below.

FIG. 34 is a view of the headlight lens 202 from below. The planar (for example optically active) surface 205 projects in the form of a step towards the optical axis of the headlight lens 202 beyond the base edge 206 or beyond the surface of the base edge 206 facing the light source 210, wherein the height h of the step is e.g. no greater than 1 mm, for example no greater than 0.5 mm. The nominal value of the height h of the step is for example 0.2 mm.

The thickness r of the base edge 206 is at least 2 mm, but no greater than 5 mm. According to FIG. 34, the diameter DL of the headlight lens 202 is at least 40 mm, but no greater than 100 mm. The diameter DB of the substantially planar (for example optically active) surface 205 is equal to the diameter of the convex curved optically active surface 204. In a further embodiment, the diameter DB of the substantially planar optically active surface 205 is no greater than 110% of the diameter DA of the convex curved optically active surface 204. In addition, the diameter DB of the substantially planar optically active surface 205 is for example at least 90% of the diameter DA of the convex curved optically active surface 204. The diameter DL of the headlight lens 202 is for example approximately 5 mm greater than the diameter DB of the substantially planar optically active surface 205 and/or than the diameter DA of the convex curved optically active surface 204. The diameter DLq of the headlight lens 202 extending orthogonally to DL is at least 40 mm, but no greater than 80 mm, and is less than the diameter DL. The diameter DLq of the headlight lens 202 is for example approximately 5 mm greater than the diameter DBq that is orthogonal to DB.

In a further embodiment, the (optically active) surface 204 intended to face away from the light source and/or the (optically active) surface 205 intended to face the light source have a surface structure that scatters light (and is generated/pressed by molding). A suitable light-scattering surface structure e.g. includes modulation and/or (surface) roughness of at least 0.05 μm, for example at least 0.08 μm, and/or is configured as modulation optionally having an additional (surface) roughness of at least 0.05 μm, for example at least 0.08 μm. Within the meaning of the disclosure, roughness is for example intended to be defined as Ra, for example in accordance with ISO 4287. In a further embodiment, the light-scattering surface structure may have a structure that simulates the surface of a golf ball or may be configured as a structure that simulates the surface of a golf ball. Suitable light-scattering surface structures are disclosed in DE 10 2005 009 556 A1, DE 102 26 471 B4 and DE 299 14 114 U1, for example. Other configurations of light-scattering surface structures are disclosed in the German patent specification 1 099 964, DE 36 02 262 C2, DE 40 31 352 A1, U.S. Pat. No. 6,130,777, US 2001/0033726 A1, JP 10123307 A, JP 09159810 A, DE 11 2018 000 084 A5 and JP 01147403 A.

Figure 35:
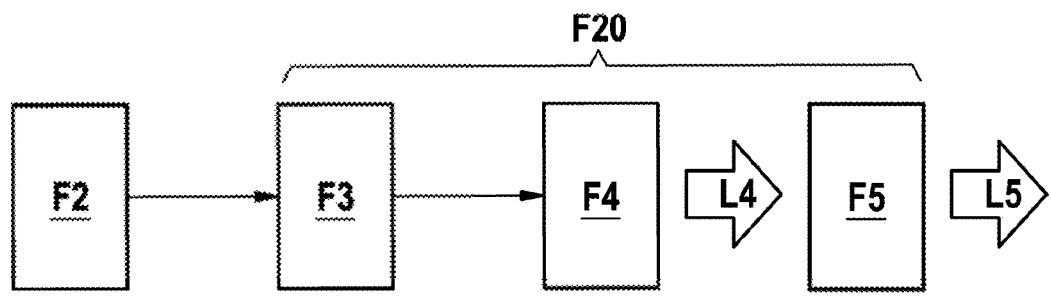
FIG. 35 shows a schematic view of an embodiment of a vehicle headlight.
Figure 36:
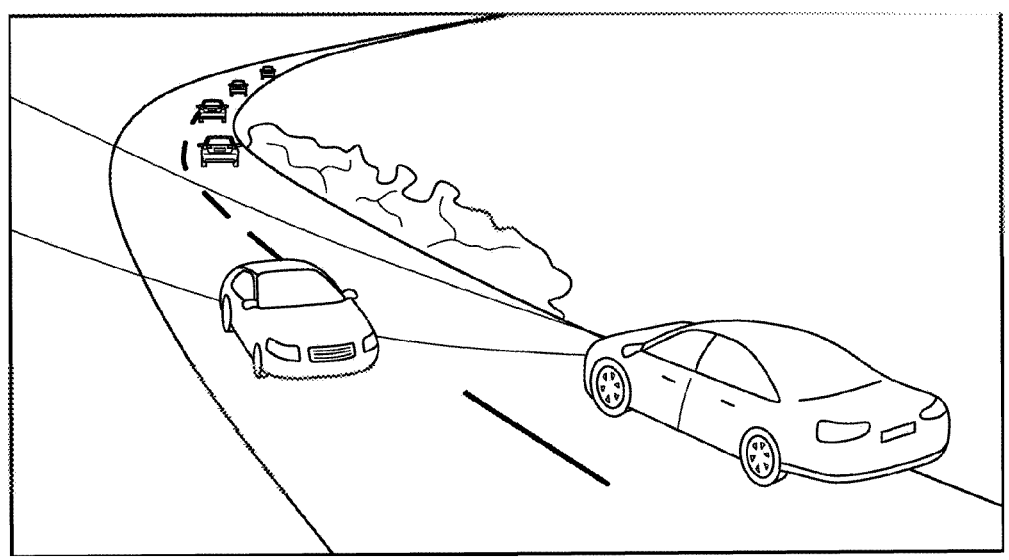
FIG. 36 shows an embodiment of matrix light or adaptive high beam.
Figure 37:
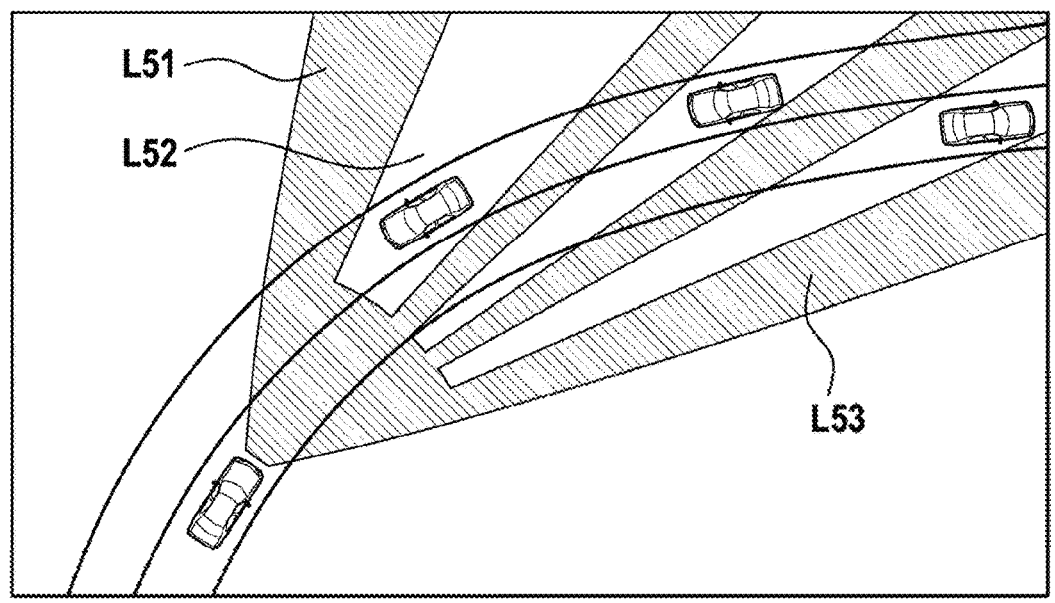
FIG. 37 shows another embodiment of matrix light or adaptive high beam.

FIG. 35 shows an adaptive headlight or vehicle headlight F20 for the situation-dependent or traffic-dependent illumination of the surroundings or carriageway in front of the motor vehicle 20 on the basis of a surround sensor system F2 of the motor vehicle 20. For this purpose, the vehicle headlight F20 shown schematically in FIG. 35 comprises an illumination device F4, which is actuated by means of a controller F3 of the vehicle headlight F20. Light L4 generated by the illumination device F4 is emitted by the vehicle headlight F20 in the form of an illumination pattern L5 by means of an objective lens F5, which may comprise one or more optical lens elements or headlight lenses. Examples of corresponding illumination patterns are shown in FIGS. 36 and 37, and the websites web.archive.org/web/20150109234745/http://www.audi.de/content/de/brand/de/vorsprung_durch_technik/content/2013/08/Audi-A8-er-strahlt-in-neuem-Licht.html (retrieved on Sep. 5, 2019) and www.all-electronics.de/matrix-led-und-laserlicht-bietet-viele-vorteile/ (retrieved on Sep. 2, 2019). In the configuration according to FIG. 37, the illumination pattern L5 comprises full-beam regions L51, dimmed regions L52 and cornering light L53.

Figure 38:
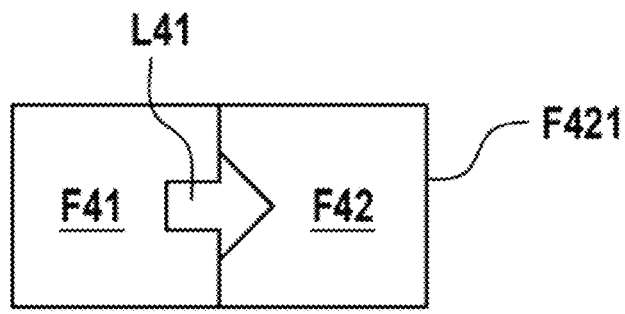
FIG. 38 shows an embodiment of an illumination device of a vehicle headlight according to FIG. 35.

FIG. 38 shows an embodiment of the illumination device F4, wherein it comprises a light-source assembly F41 having a plurality of individually adjustable regions or pixels. Therefore, up to 100 pixels, up to 1000 pixels or no less than 1000 pixels may for example be provided, which can be individually actuated by means of the controller F3 to the effect that they can be individually activated or deactivated, for example. It may be provided that the illumination device F4 also comprises light-shaping optics F42 for generating a light pattern (such as L4) on the light exit surface F421 on the basis of the accordingly actuated regions or pixels of the light-source assembly F41 or according to the light L41 directed into the light-shaping optics F42.

Within the meaning of this disclosure, matrix headlights may also be matrix SSL HD headlights. Examples of headlights of this kind are found at the links www.springerprofessional.de/fahrzeug-lichttechnik/fahrzeugsicherheit/hella-bringtneues-ssl-hd-matrix-lichtsystem-auf-den-markt/17182758 (retrieved on May 28, 2020), www.highlight-web.de/5874/hella-ssl-hd/ (retrieved on May 28, 2020) and www.hella.com/techworld/de/Lounge/Unser-Digital-Light-SSL-HD-Lichtsystem-einneuer-Meilenstein-der-automobilen-Lichttechnik-55548/ (retrieved on May 28, 2020).

Figure 39:
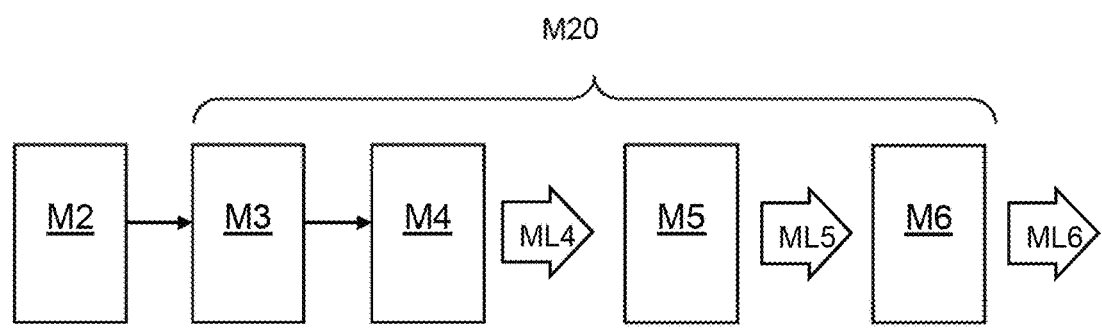
FIG. 39 shows an embodiment of an alternative vehicle headlight.

Another suitable field of application for lenses produced according to the disclosure is for example disclosed in DE 10 2017 105 888 A1 or the headlight described with reference to FIG. 39. In this case, by way of example, FIG. 39 shows a light module (headlight) M20 which comprises a light-emission unit M4 having a plurality of punctiform light sources that are arranged in a matrix-like manner and each emits light ML4 (with a Lambert's emission characteristic), and also comprises a concave lens M5 and projection optics M6. In the example according to FIG. 39 shown in DE 10 2017 105 888 A1, the projection optics M6 comprise two lenses which are arranged one behind the other in the beam path and have been manufactured according to a process corresponding the above-mentioned method. The projection optics M6 image the light ML4 emitted by the light-emission unit M4 and light ML5 that is further shaped after passing through the concave lens M5, in the form of a resulting light distribution ML6 of the light module M20, on a carriageway in front of the motor vehicle in which the light module or headlight is (has been) installed.

The light module M20 comprises a controller denoted by reference sign M3, which actuates the light-emission unit M4 on the basis of the values from a sensor system or surround sensor system M2. The concave lens M5 comprises a concave curved exit surface on the side facing away from the light-emission unit M4. The exit surface of the concave lens M5 deflects light ML4 directed into the concave lens M5 from the light-emission unit M4 at a large emission angle towards the edge of the concave lens by means of total reflection, such that said light is not transmitted through the projection optics M6. According to DE 10 2017 105 888 A1, light beams that are emitted from the light-emission unit M4 at a "large emission angle" are referred to as those light beams which (without arranging the concave lens M5 in the beam path) would be imaged poorly, for example in a blurred manner, on the carriageway by means of the projection optics M6 owing to optical aberrations and/or could result in scattered light, which reduces the contrast of the imaging on the carriageway (see also DE 10 2017 105 888 A1). It may be provided that the projection optics M6 can only image light in focus at an opening angle limited to approximately +/−20 degree. Light beams having opening angles of greater than +/−20 degree, for example greater than +/−30 degree, are therefore prevented from impinging on the projection optics M6 by arranging the concave lens M5 in the beam path.

The light-emission unit M4 may be designed differently. According to one configuration, the individual punctiform light sources of the light-emission unit M4 each comprise a semiconductor light source, for example a light-emitting diode (LED). The LEDs may be actuated individually or in groups in a targeted manner in order to activate or deactivate or dim the semiconductor light sources. The light module M20 e.g. comprises more than 1,000 individually actuable LEDs. For example, the light module M20 may be designed as what is known as a μAFS (micro-structured adaptive front-lighting system) light module.

According to an alternative option, the light-emission unit M4 comprises a semiconductor light source and a DLP or micromirror array, which comprises a large number of micromirrors which can be actuated and tilted individually, wherein each of the micromirrors forms one of the punctiform light sources of the light-emission unit M4. The micromirror array for example comprises at least 1 million micromirrors, which may for example be tilted at a frequency of up to 5,000 Hz.

Figure 40:
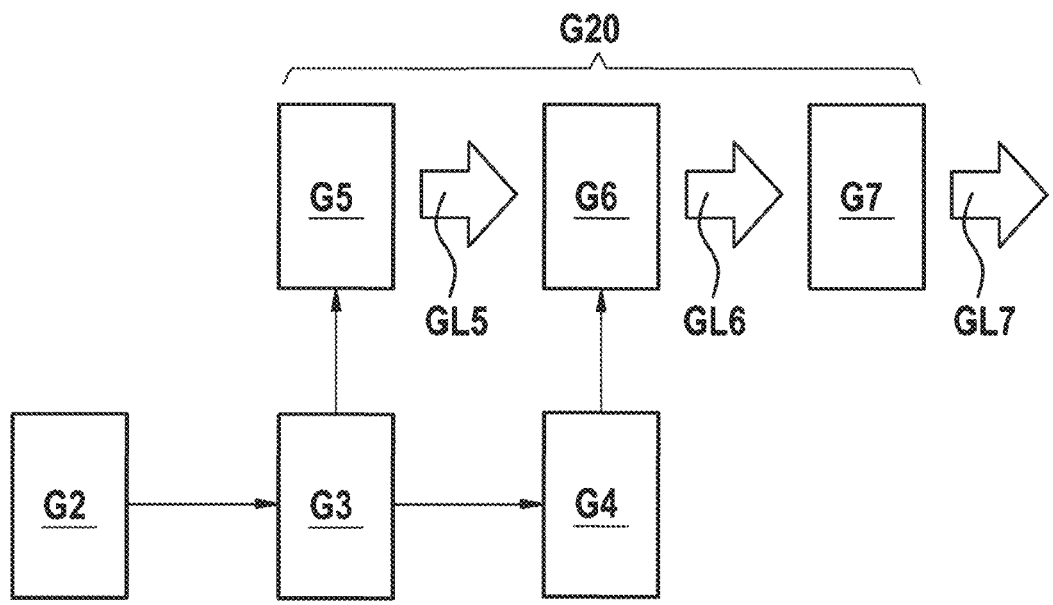
FIG. 40 shows a further embodiment of an alternative vehicle headlight.
Figure 41:
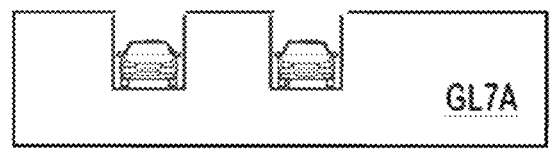
FIG. 41 shows an example of the illumination by means of a headlight according to FIG. 40.

Another example of a headlight system or light module (DLP system) is disclosed by the link www.al-lighting.com/news/article/digital-light-millions-of-pixels-on-the-road/ (retrieved on Apr. 13, 2020). FIG. 40 schematically shows a corresponding headlight module or vehicle headlight for generating an illumination pattern denoted by GL7A in FIG. 41. The adaptive headlight G20 schematically shown in FIG. 40 for the situation-dependent or traffic-dependent illumination of the surroundings or carriageway in front of the motor vehicle 20 on the basis of a surround sensor system G2 of the motor vehicle 20. Light GL5 generated by the illumination device G5 is shaped by means of a system of micromirrors G6, as also shown in DE 10 2017 105 888 A1, for example, to form an illumination pattern GL6 which, by means of projection optics G7 for adaptive illumination, radiates suitable light GL7 in front of the motor vehicle 20 or in the surroundings onto the carriageway in front of the motor vehicle 20. A suitable system G6 of movable micromirrors is disclosed by the link www.al-lighting.com/news/article/digital-light-millions-of-pixels-on-the-road/ (retrieved on Apr. 13, 2020).

A controller G4 is provided for actuating the system G6 comprising movable micromirrors. In addition, the headlight G20 comprises a controller G3 both for synchronizing with the controller G4 and for actuating the illumination device G5 on the basis of the surround sensor system G2. Details of the controllers G3 and G4 can be found at the link www.al-lighting.com/news/article/digital-light-millions-of-pixels-on-the-road/ (retrieved on Apr. 13, 2020). The illumination device G5 may for example comprise an LED assembly or a comparable light-source assembly, optics such as a field lens (which, for example, has likewise been manufactured according to the above-described process) and a reflector.

Figure 42:
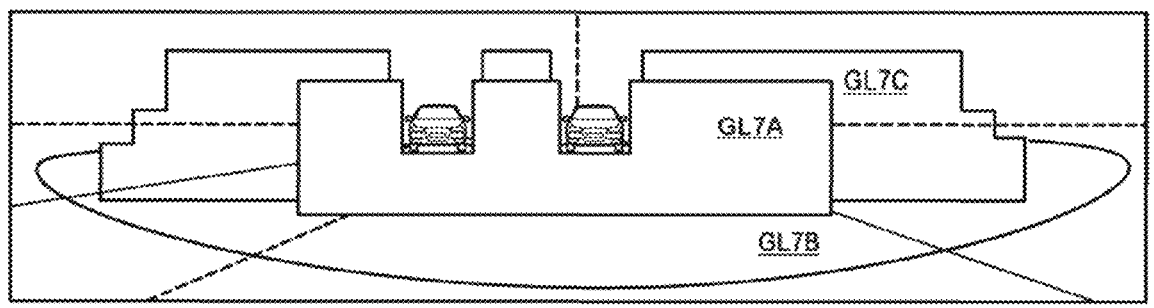
FIG. 42 shows an embodiment of superimposed illumination using the illumination according to FIG. 41 and the illumination by two other headlight systems or sub-systems.

The vehicle headlight G20 described with reference to FIG. 40 may for example be used in connection with other headlight modules or headlights in order to obtain a superimposed overall light profile or illumination pattern. This is shown by way of example in FIG. 42, wherein the overall illumination pattern is compiled from the illumination patterns GL7A, GL7B and GL7C. In this process, it may for example be provided that the illumination pattern GL7C is generated by means of the headlight 20 and the illumination pattern GL7B is generated by means of a further headlight.

Sensor systems for the above-mentioned headlights for example comprise a camera and analysis or pattern recognition for analyzing a signal provided by the camera. A camera for example comprises an objective lens or a multiple-lens objective lens as well as an image sensor for imaging an image generated by the objective lens on the image sensor. In a suitable manner, an objective lens is used as disclosed in U.S. Pat. No. 8,212,689 B2 (incorporated by reference in its entirety). An objective lens of this kind is suitable because it prevents or significantly reduces parasitic images, since an objective lens of this kind can for example prevent a parasitic image of a vehicle coming in the other direction with its lights on being confused with a vehicle driving in front with its lights on. A suitable objective lens, for example for infrared light and/or visible light, images an object in an image plane, wherein, in relation to the imaging of an object, it is applicable to each point within the image circle of the objective lens or to at least one point within the image circle of the objective lens that Pdyn ≥70 dB, for example Pdyn ≥80 dB, for example Pdyn ≥90dB, wherein Pdyn is equal to 10·log(Pmax/Pmin), wherein Pmax is the maximum luminous power of a point in the image plane for imaging a point on the object, and wherein Pmin is the luminous power of another point in the image plane for imaging the point on the object, the luminous power of which in relation to the imaging of the point on the object is greater than the luminous power of each other point in the image plane in relation to the imaging of the point on the object or wherein Pmin is the maximum luminous power of the parasitic-image signals from the point on the object as imaged at another point. The lenses or some of the lenses of the objective lens of such an objective can be manufactured according to the claimed or disclosed process, wherein it is for example provided that the accordingly produced lenses comprise a circumferential or partially circumferential edge.

Figure 3:
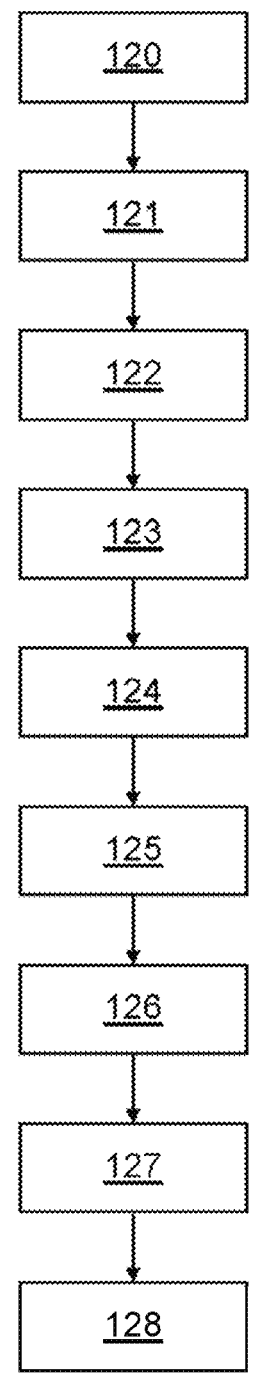
FIG. 3 shows an exemplary sequence of a process for manufacturing motor-vehicle headlight lenses or lens-like free-forms for a motor-vehicle headlight or optical elements from glass.

The device 1 according to FIG. 1 for manufacturing optical elements such as the headlight lens 202 comprises a melting unit 2, such as a trough, in which soda-lime glass, in the present embodiment DOCTAN®, is melted in a process step 120 according to FIG. 3. The melting unit 2 may e.g. comprise an adjustable outlet 2B. In a process step 121, liquid glass is brought from the melting unit 2 into a preform device 3 for producing a preform, such as a gob, for example having a mass of from 10 g to 400 g, for example a mass of from 50 g to 250 g, or a preform that is close to the final contours (a preform that is close to the final contours has a contour that is similar to the contour of the motor-vehicle headlight lens to be pressed or to the lens-like free-form for motor-vehicle headlights). This may e.g. comprise molds in which a defined quantity of glass is cast. The preform is produced in a process step 122 by means of the preform device 3.

The process step 122 is followed by a process step 123, in which the preform is transferred to the cooling apparatus 5 by means of a transfer station 4 and is cooled by means of the cooling apparatus 5 at a temperature of between 300° C. and 500° C., for example of between 350° C. and 450° C. In the present embodiment, the preform is cooled for over 10 minutes at a temperature of 400° C., such that its temperature in the interior is approximately 500° C. or greater, for example 600° C. or greater, for example $T_G$ or greater.

In a subsequent process step 124, the preform is heated by means of the heating apparatus 6 at a temperature of no less than 700° C. and/or no greater than 1600° C., for example of between 1000° C. and 1250° C., wherein it is for example provided that the preform is heated such that the temperature of the surface of the preform after the heating is at least 100° C., for example at least 150° C., greater than $T_G$ and is for example 750° C. to 900° C., for example 780° C. to 850° C. A combination of the cooling apparatus 5 with the heating apparatus 6 is an example of a temperature-control apparatus for setting the temperature gradient.

Figure 14:
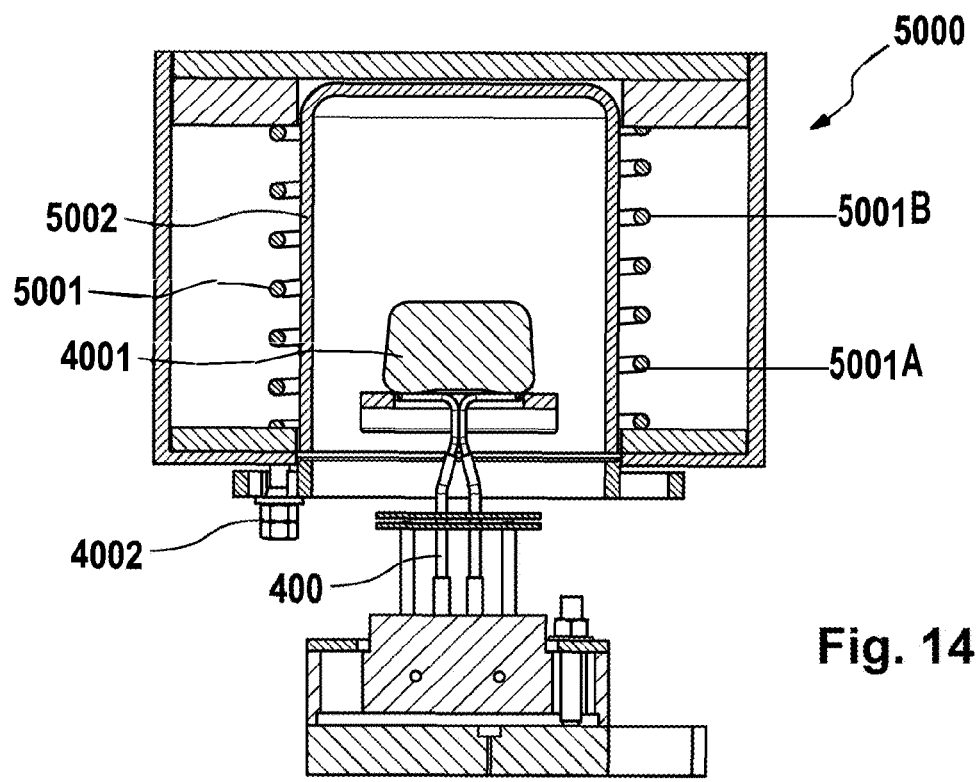
FIG. 14 shows a lance according to FIG. 5 in a hood-type annealing furnace comprising a protective cover for heating a gob (blank)
Figure 15:
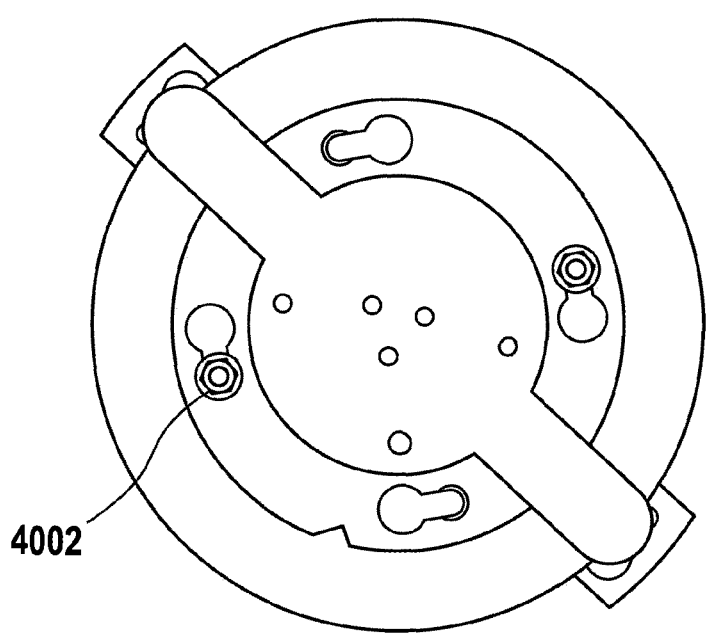
FIG. 15 shows a view of the hood-type annealing furnace according to FIG. 14 from below.

In one configuration, this temperature-control apparatus and/or the combination of the heating apparatuses 5 and 6 is designed as a hood-type annealing furnace 5000, as shown in FIG. 14. FIG. 14 shows a preform to be heated in the form of a gob 4001 on a support device 400 designed as a lance. Heating coils 5001 are provided for heating the gob 4001. In order to protect these heating coils 5001 against a defective gob bursting open, the interior of the hood-type annealing furnace 5000 is lined with a protective cover 5002. FIG. 15 is a view of the hood-type annealing furnace 5000 according to FIG. 14 from below, FIG. 16 is a cross section through the protective cover 5002 according to FIG. 14, and FIG. 17 is a view into the interior of the protective cover 5002 according to FIG. 14 and FIG. 18 shows a spatial representation of the protective cover 5002. In the embodiment according to FIG. 14, this protective cover 5002 is configured to be cup-shaped. In this configuration, the protective cover 5002 comprises a cylindrical region 5112, which transitions into a covering region 5122 via a rounded region 5132. The radius of curvature of the curved region 5132 is between 5 mm and 20 mm, for example. In the embodiment according to FIG. 16, the radius of curvature of the curved region 5132 is approximately 10 mm. The protective cover 5002 is secured in the hood-type annealing furnace 5000 and is fixed by a nut 4002. In another preferred configuration, a bayonet catch is provided, by means of which a protective cover can be changed more rapidly.

The protective covers 5002, 5202, 5302 for example have the purpose of protecting the heating coils 5001 positioned in the furnace against glass bursting open. If a gob bursts open in the furnace without this protective cover, some of the glass or the majority of the glass clings to the heating coils 5001 and thus significantly impairs the heating process for the next gob or even destroys the heating coils 5001 and thus destroys the entire functional capability of the furnace. The protective covers 5002, 5202, 5302 are removed after a gob has burst and are replaced with other protective covers. The protective covers 5002, 5202, 5302 are adapted to the size of the furnace.

The heating coils 5001 can consist of or comprise a plurality of independently actuatable heating coils 5001A and 5001B. Because said coils are independently actuatable, a suitable, for example homogeneous, temperature (distribution) can be obtained inside the furnace or inside the protective covers 5002, 5202, 5303. In addition to their function of reducing the severity of a gob bursting open, the protective covers 5002, 5202, 5303 contribute to this desired temperature distribution. The protective covers for example consist of or comprise silicon carbide.

Figure 7:
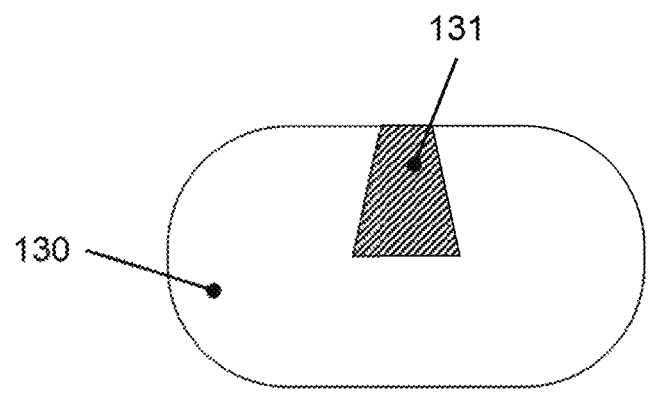
FIG. 7 shows an exemplary preform before entering a temperature-control apparatus.
Figure 8:
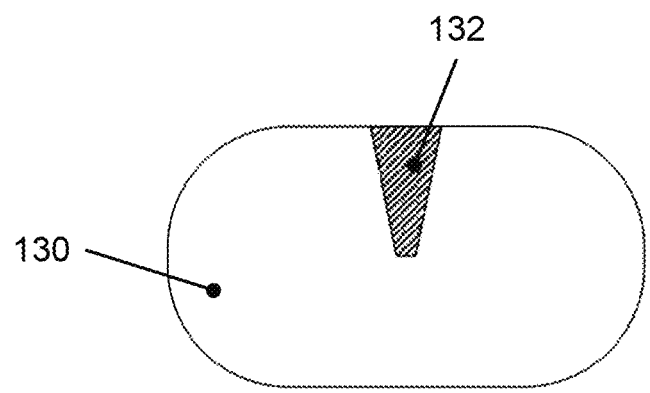
FIG. 8 shows an exemplary preform having a reversed temperature gradient after leaving a temperature-control apparatus.

As explained below with reference to FIGS. 7 and 8, the process steps 123 and 124 are coordinated with one another such that a reversal of the temperature gradient is obtained. In this case, FIG. 7 shows an exemplary preform 130 before entering the cooling apparatus 5 and FIG. 8 shows the preform 130 with a reversed temperature gradient after leaving the heating apparatus 6. While the blank is hotter inside than outside before the process step 123 (with a continuous temperature curve), it is hotter outside than inside after the process step 124 (with a continuous temperature curve). The wedges denoted by reference signs 131 and 132 symbolize the temperature gradients here, wherein the width of a wedge 131 or 132 symbolizes a temperature.

Figure 5:
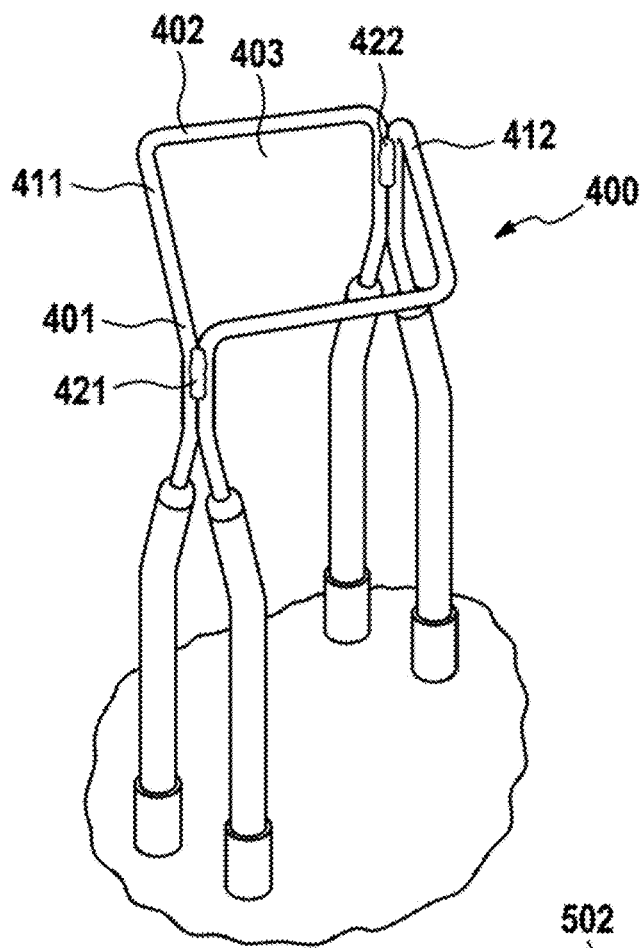
FIG. 5 shows an embodiment of a lance.

In order to reverse its temperature gradient, in an illustrative embodiment, a preform resting on a cooled lance (not shown) is moved through the temperature-control device comprising the cooling apparatus 5 and the heating apparatus 6 (for example substantially continuously) or is held in one of the cooling apparatuses 5 and/or one of the heating apparatuses 6. A cooled lance is disclosed in DE 101 00 515 A1 and in DE 101 16 139 A1. Depending on the shape of the preform, for example FIGS. 5 and 6 show suitable lances.

For example, coolant flows through the lance in accordance with the counterflow principle. Alternatively or additionally, it may be provided that the coolant is additionally and/or actively heated.

For the term "lance", the term "support device" is also used in the following. The support device 400 shown in FIG. 5 comprises a carrier body 401 having a hollow cross section and an annular support surface 402. The carrier body 401 is tubular at least in the region of the support surface 402 and is uncoated at least in the region of the support surface 402. The diameter of the hollow cross section of the carrier body 401, at least in the region of the support surface 402, is no less than 0.5 mm and/or no greater than 1 mm. The external diameter of the carrier body 401, at least in the region of the support surface, is no less than 2 mm and/or no greater than 3 mm. The support surface 402 spans a square base surface 403 having rounded corners. The carrier body 401 comprises two flow channels 411 and 412 for the coolant flowing therethrough, which each only extend over a section of the annular support surface 402, wherein the flow channels 411 and 412 are connected in a region in which they leave the support surface 402 by means of metal filler material 421 and 422, for example solder.

Figure 6:
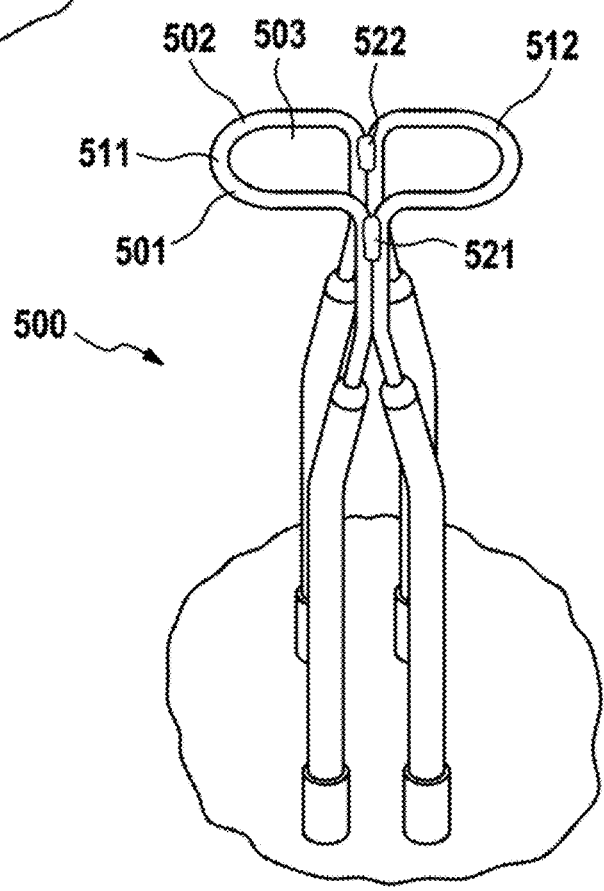
FIG. 6 shows another embodiment of a lance.

The support device 500 shown in FIG. 6 comprises a support body 501 having a hollow cross section and an annular support surface 502. The carrier body 501 is tubular at least in the region of the support surface 502 and is uncoated at least in the region of the support surface 502. The diameter of the hollow cross section of the carrier body 501, at least in the region of the support surface 502, is no less than 0.5 mm and/or no greater than 1 mm. The external diameter of the carrier body 501, at least in the region of the support surface, is no less than 2 mm and/or no greater than 3 mm. The support surface 502 spans an oval base surface 503. The carrier body 501 comprises two flow channels 511 and 512 for the coolant flowing therethrough, which each only extend over a section of the annular support surface 502, wherein the flow channels 511 and 512 are connected in a region in which they leave the support surface 502 by means of metal filler material 521 and 522, for example solder.

It may be provided that, after passing through the cooling apparatus 5 (in the form of a cooling path), preforms are removed and are supplied by means of a transport apparatus 41, for example, to an intermediate storage unit (e.g. in which they are stored at room temperature). In addition, it may be provided that preforms are conducted to the transfer station 4 by means of a transport apparatus 42 and are phased into the continuing process by heating in the heating apparatus 6 (for example starting from room temperature).

In a departure from the method described with reference to FIG. 3, in the process described with reference to FIG. 4, the process step 121 is followed by the process step 122', in which the cast gobs are transferred to a cooling path 49 of the device 1A, as shown in FIG. 2A, by means of a transfer station 4. In this sense, a cooling path is for example a conveying apparatus, such as a conveyor belt, through which a gob is guided and is cooled in the process, for example with the addition of heat. The cooling is carried out to a certain temperature above room temperature or to room temperature, wherein the gob is cooled down to room temperature in the cooling path 49 or outside the cooling path 49. It is for example provided that a gob rests on a base made of graphite or a base containing graphite in the cooling path 49.

Figure 4:
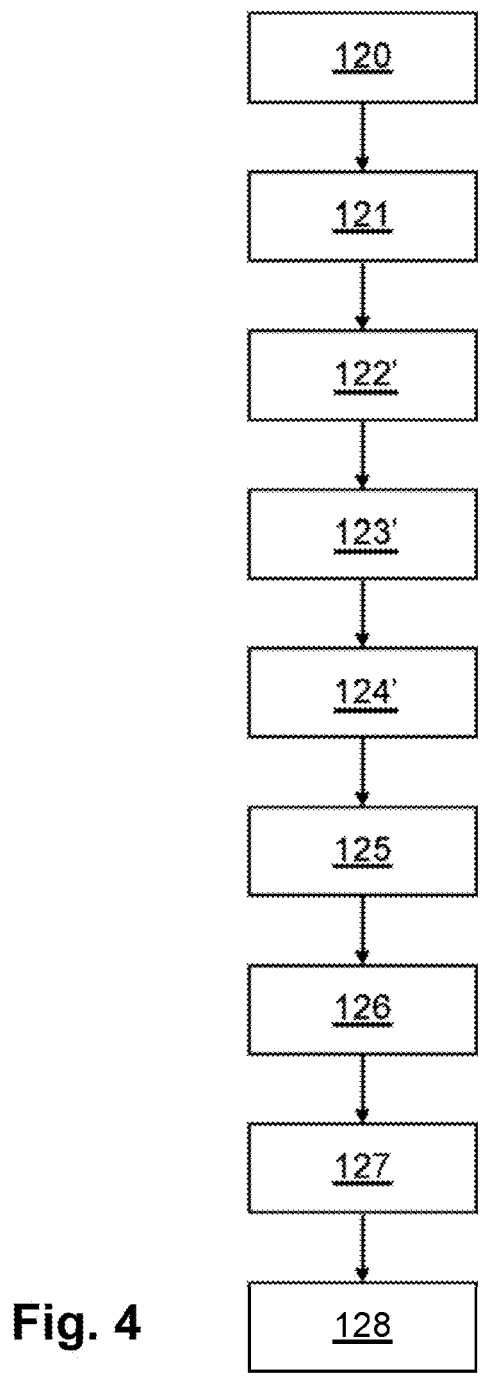
FIG. 4 shows an alternative sequence of a process for manufacturing motor-vehicle headlight lenses or lens-like free-forms for a motor-vehicle headlight or optical elements from glass.

In the subsequent process step 123' according to FIG. 4, the gobs are supplied to a device 1B. The devices 1A and 1B may be in close proximity to one another, but may also be further away from one another. In the latter case, a transfer station 4A transfers the gobs from the cooling path 49 to a transport container BOX. The gobs are transported in the transport container BOX to the device 1B, in which a transfer station 4B removes the gobs from the transport container BOX and passes them to a hood-type annealing furnace 5000. The gobs are heated in the hood-type annealing furnace 5000 (process step 124').

Figure 19:
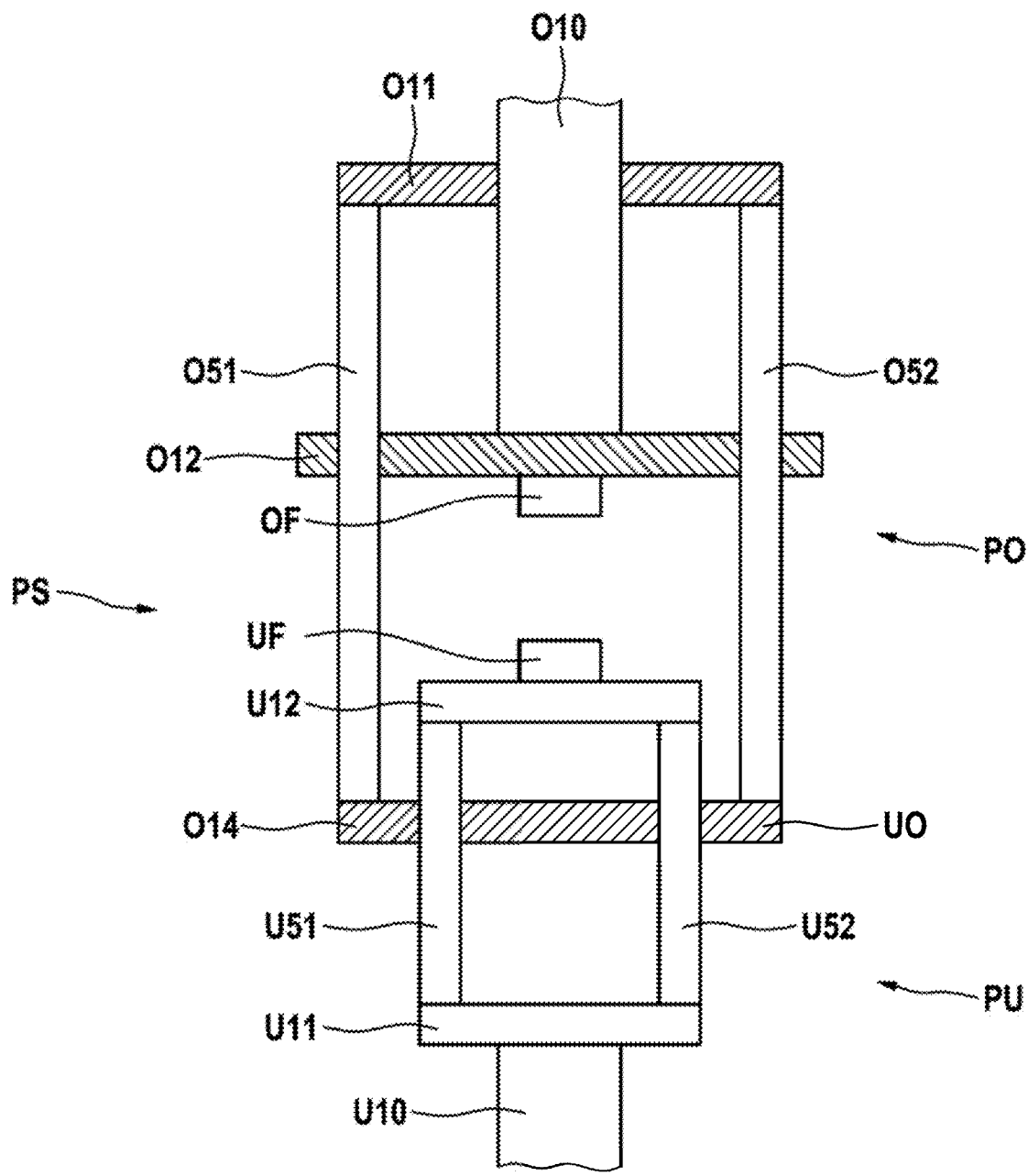
FIG. 19 shows a schematic view of a pressing station for pressing a headlight lens from a heated blank.

A press 8, onto which a preform is transferred by means of a transfer station 7, is provided behind the heating apparatuses 6 or 5000. The preform is press-molded, for example on both sides, to form an optical element, such as the headlight lens 202, in a process step 125 by means of the press 8. A suitable mold set is disclosed e.g. in EP 2 104 651 B1. FIG. 19 is a schematic view of a pressing station PS for pressing an optical element from a heated blank. The pressing station PS is part of the press 8 according to FIGS. 1 and 2B. The pressing station PS comprises an upper pressing unit PO and a lower pressing unit PU. For the pressing, a mold OF (upper mold), which is moved by means of a press drive or by means of an actuator O10, and a mold UF (lower mold), which is moved by means of a press drive or by means of an actuator U10, are moved towards one another. The mold UF is connected to a mold-side movable connector U12, which is in turn connected to an actuator-side movable connector U11 by means of movable guide rods U51, U52. The actuator U10 is in turn connected to the actuator-side movable connector U11, such that the mold UF is movable by means of the actuator U10. The movable guide rods U51 and U52 extend through recesses in a fixed guide element UO such that any displacement or movement of the movable guide rods U51 and U52 and therefore of the mold UF perpendicularly to the movement direction is prevented or reduced or limited.

The pressing unit PO comprises an actuator O10, which moves the mold OF and is connected to a movable guide element O12. The pressing unit PO also comprises a frame, which is formed by an actuator-side fixed connector O11 and a mold-side fixed connector O14 as well as fixed guide rods O51 and O52, which connect the actuator-side fixed connector O11 to the mold-side fixed connector O14. The fixed guide rods O51 and O52 are guided through recesses in the movable guide element O12, such that they prevent, reduce or avoid any movement or deflection of the mold OF orthogonally to the movement direction of the actuator O10 or mold OF.

In the embodiment shown, the pressing units PO and PU are linked in that the fixed guide element UO is identical to the mold-side fixed connector O14. By linking or chaining the two pressing units PO and PU of the pressing station PS together, high quality (for example in the form of contour accuracy) of the headlight lenses to be pressed is achieved.

Figure 20:
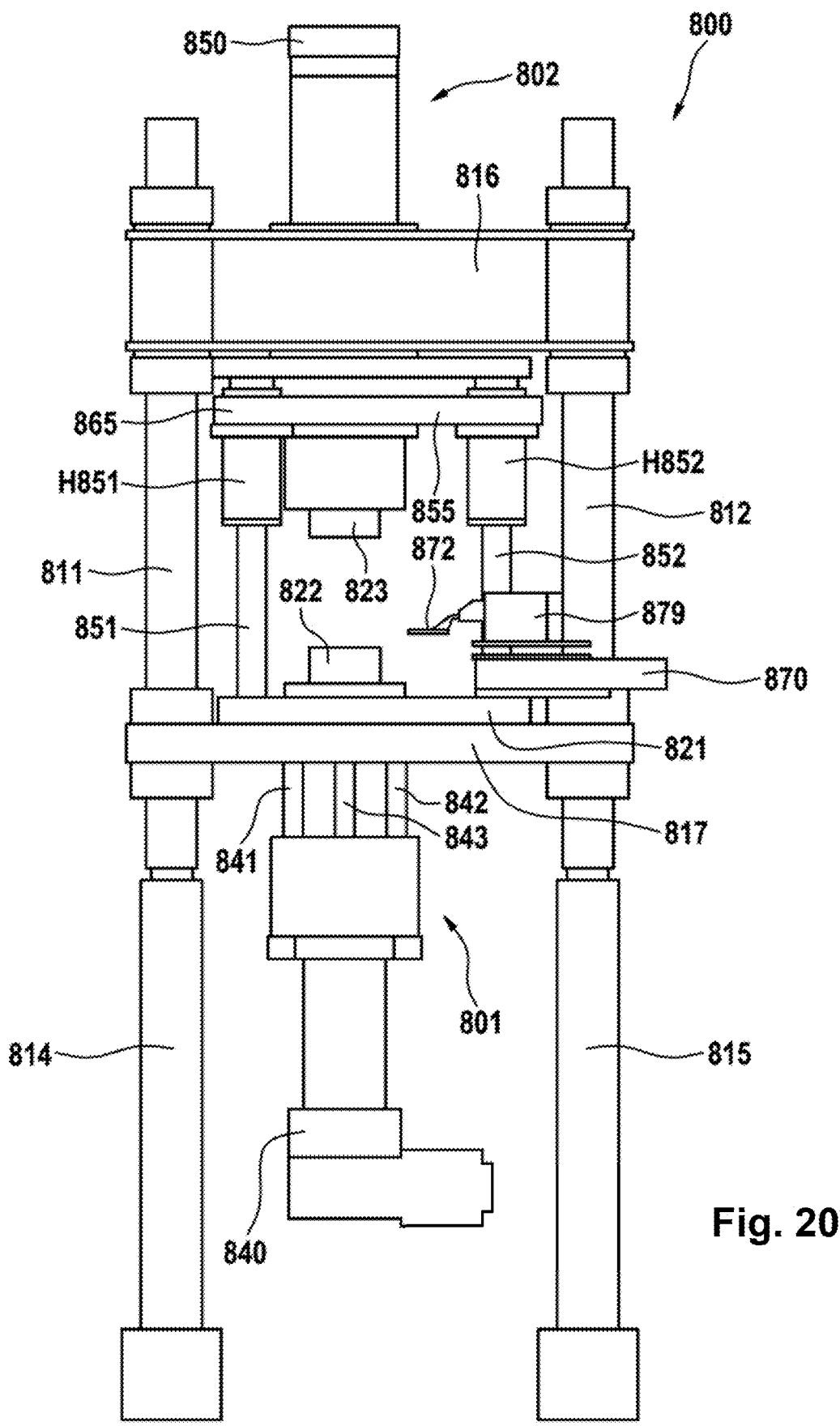
FIG. 20 shows another embodiment of a pressing station.

The pressing station 800 comprises a lower pressing unit 801 and an upper pressing unit 802 (see FIG. 20), wherein FIG. 20 shows an embodiment of a pressing station 800, by means of which optical elements, such as headlight lenses, can be pressed in a preferable and suitable manner. The pressing station 800 is an embodiment of the pressing station PS from FIG. 19. The pressing unit 801 is an embodiment of the lower pressing unit PU in FIG. 19 and the pressing unit 802 is an embodiment of the upper pressing unit PO in FIG. 19. The pressing station 800 comprises a pressing frame, which, in an exemplary configuration, comprises the interconnected rods 811 and 814 as well as the interconnected rods 812 and 815. The rods 811 and 812 are interconnected by a lower plate 817 and an upper connection part

816 and thus form a pressing frame, which receives the lower pressing unit 801 and the upper pressing unit 802.

The lower pressing unit 801 comprises a press drive 840 corresponding to the actuator U10, by means of which drive three rods 841, 842, 843 are movable, in order to move a lower press mold 822 that is coupled to the rods 841, 842, 843 and corresponds to the mold UF. The rods 841, 842, 843 are guided through bores or holes (not shown) in the plate 817 and a plate 821, which prevent or considerably reduce a deviation or movement of the press mold 822 in a direction orthogonal to the movement direction. The rods 841, 842, 843 are embodiments of the movable guide rods U51 and U52 according to FIG. 19. The plate 817 is a configuration or implementation of the fixed guide element UO.

Figure 21:
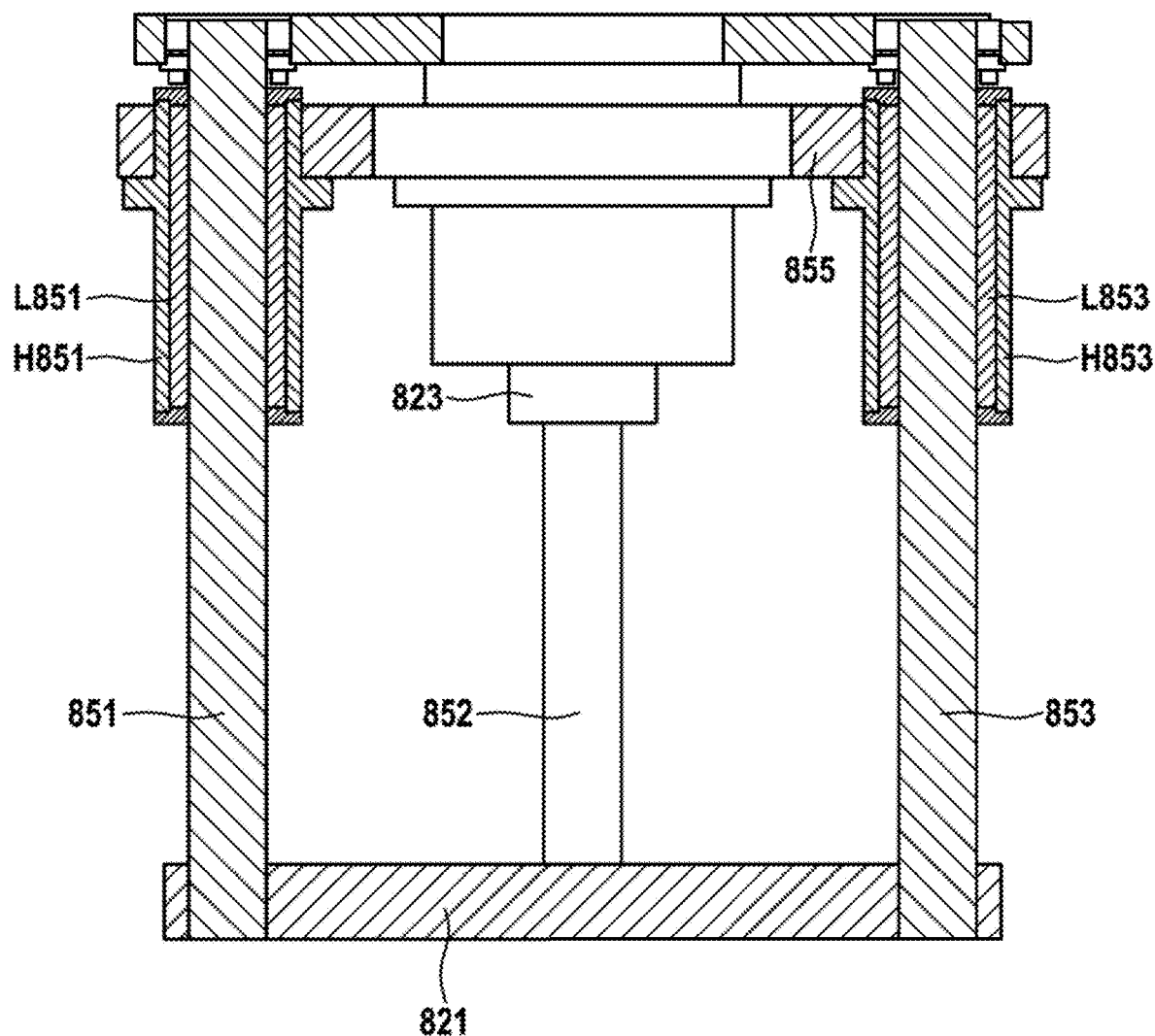
FIG. 21 shows a detail of a pressing station.

The upper pressing unit 802 shown in FIG. 21 comprises a press drive 850 which corresponds to the actuator O10 and is held by the upper connection part 816, which corresponds to the actuator-side fixed connector O11. A plate 855 which corresponds to the movable guide element O12 and comprises guide rods 851, 852 and 853 as well as an upper press mold 823 is guided by means of the press drive 850. The guide rods 851, 852 and 853 correspond to the fixed guide rods OS1 and OS2 in FIG. 19. The press mold 823 corresponds to the mold OF in FIG. 19. For the guidance, sleeves H851, H852 and H853 comprising bearings L851 and L853 are also provided as an implementation of the recesses in the movable guide plate O12 from FIG. 19, which surround the guide rods 851, 852 and 853. The plates 821 and 817 are fixed to one another and thus form the fixed guide element UO (plate 817) and the mold-side fixed connector O14 (plate 821).

Reference sign 870 denotes a movement mechanism by means of which an induction heater 879 comprising an induction loop 872 can be moved towards the lower mold 822 in order to heat it by means of the induction loop 872. After the heating by means of the induction loop 872, the induction heater 879 is moved back into its starting position again. A gob or preform is placed onto the press mold 822 and, by moving the press molds 822 and 823 towards one another, is press-molded (on both sides) to form a headlight lens.

Figure 22:
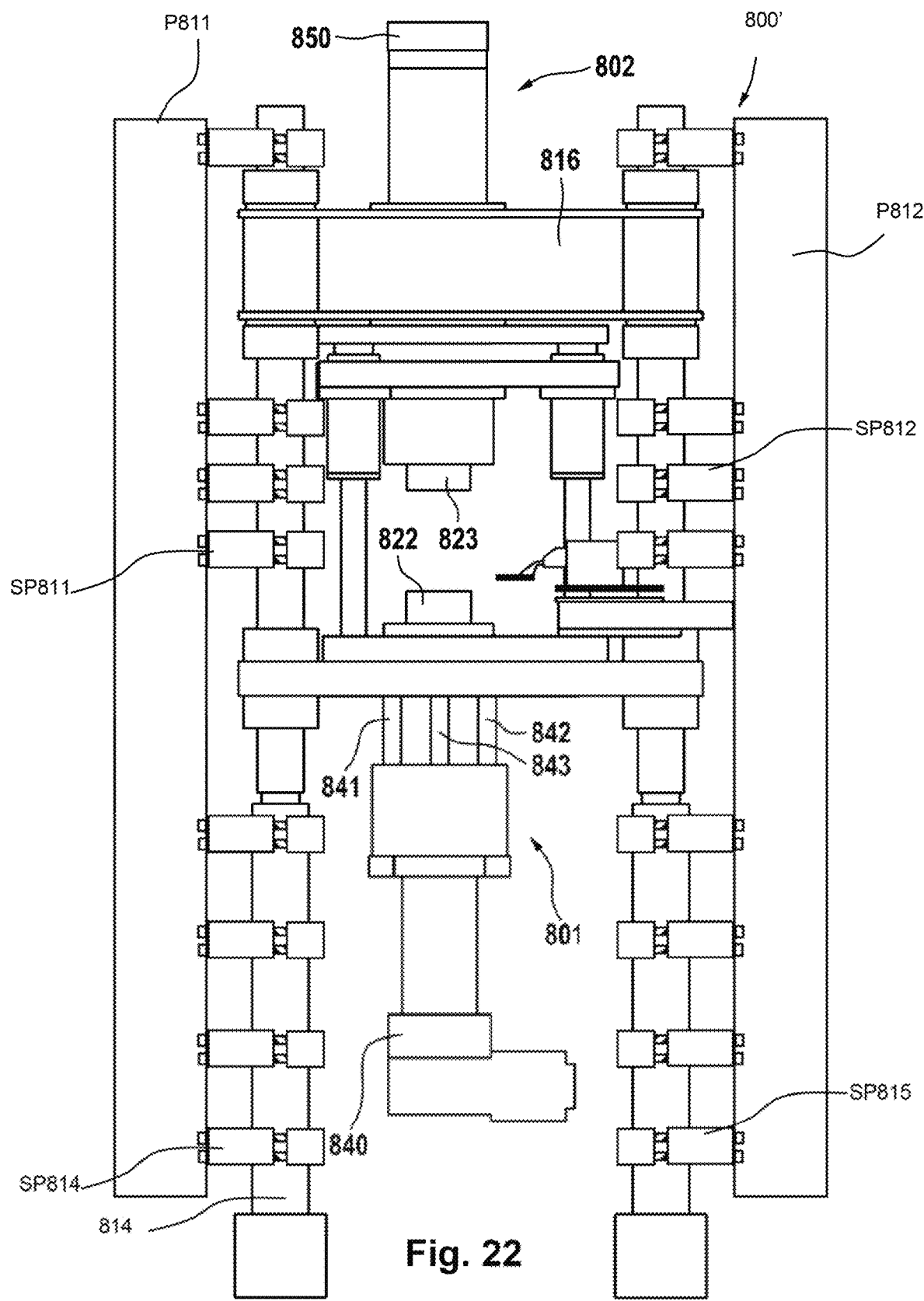
FIG. 22 shows a schematic view of a pressing station, modified with respect to the pressing station according to FIG. 19, for pressing a headlight lens from a heated blank.
Figure 23:
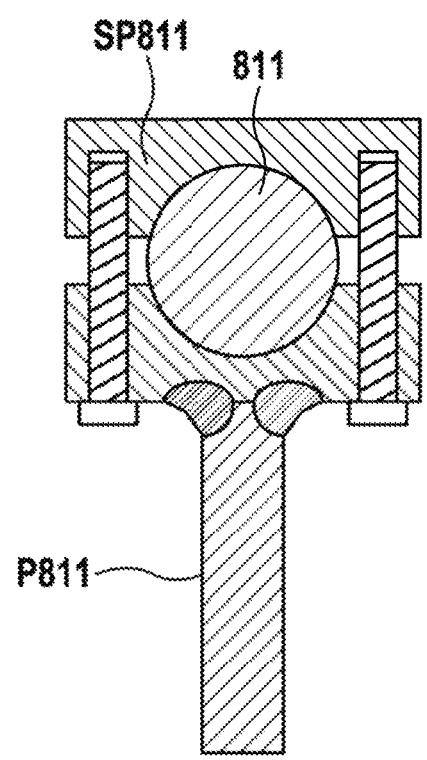
FIG. 23 shows a view of a detail of the pressing station according to FIG. 22.

FIG. 22 shows another pressing station 800', likewise as an embodiment of the pressing station PS according to FIG. 19. In a modification to the pressing station 800, a reinforcement profile P811, P812 is for example provided for each of the rods 811, 812 or the rods 814, 815, wherein the reinforcement profile P811, P812 is connected to the rods 811, 812, 814, 815 by means of clamps SP811, SP812, SP814, SP815. FIG. 23 is, by way of example, a view of a detail of a clamp SP811 of this kind, wherein one half of the clamp is welded to the reinforcement profile P811.

Figure 24:
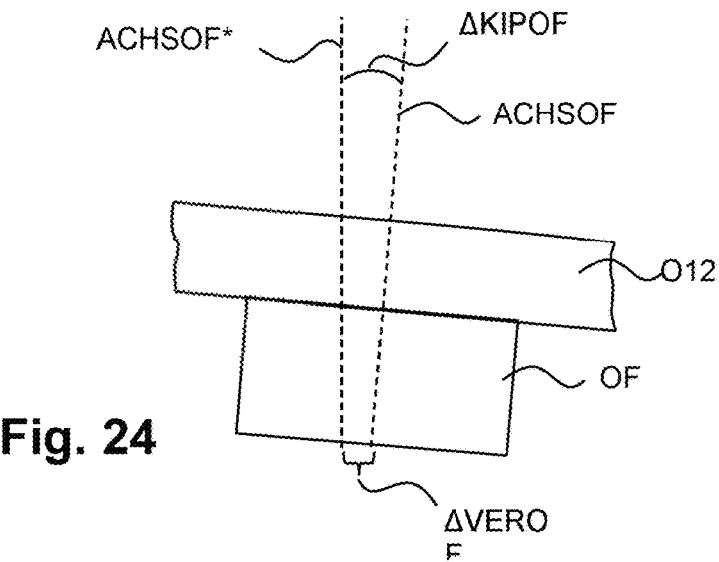
FIG. 24 shows a schematic view for explaining tilting and radial offset with regard to the upper mold.

The components are for example coordinated with one another and/or dimensioned such that the maximum tilting ΔKIPOF or the maximum angle of the tilting of the mold OF (corresponding to the angle between the target pressing direction ACHSOF* and the actual pressing direction ACHSOF), as shown in FIG. 24, is no greater than $10^{-2}$ degree, for example no greater than $5 \cdot 10^{-3}$ degree. Furthermore, it is provided that the radial offset ΔVEROF, i.e. the offset of the mold OF from its target position in the direction orthogonal to the target pressing direction ACHSOF*, is no greater than 50 μm, for example no greater than 30 μm, or no greater than 20 μm, or no greater than 10 μm.

Figure 25:
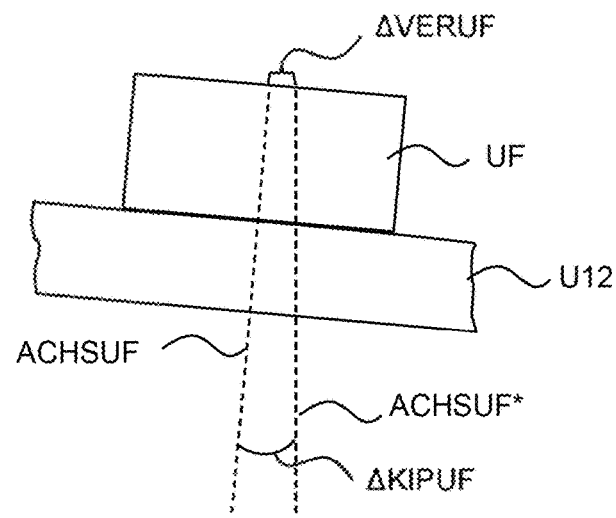
FIG. 25 shows a schematic view for explaining tilting and radial offset with regard to the lower mold.

The components are for example coordinated with one another and/or dimensioned such that the maximum tilting ΔKIPUF or the maximum angle of the tilting of the mold UF (corresponding to the angle between the target pressing direction ACHSUF* and the actual pressing direction ACHSUF), as shown in FIG. 25, is no greater than $10^{-2}$ degree, for example no greater than $5 \cdot 10^{-3}$ degree. Furthermore, it is provided that the radial offset ΔVERUF, i.e. the offset of the mold UF from its target position in the direction orthogonal to the target pressing direction ACHSUF*, is no greater than 50 μm, for example no greater than 30 μm, or no greater than 20 μm, or no greater than 10 μm.

Figure 26:
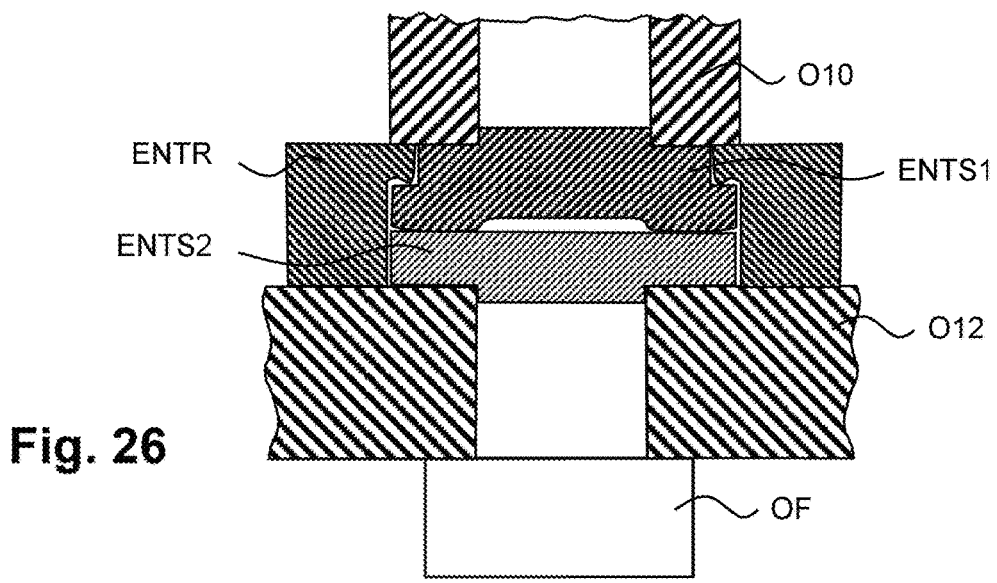
FIG. 26 shows an embodiment of a decoupling element for torsion.

Additionally or alternatively, it may be provided that the actuator O10 is decoupled from torsion from the movable guide element O12 comprising the mold OF. In addition, it may be provided that the actuator U10 is also decoupled from torsion from the mold-side movable connector U12 together with the mold UF. FIG. 26 shows decoupling of this kind on the basis of the example of decoupling the actuator O10 from the mold OF together with the movable guide element O12. The decoupler, which comprises the ring ENTR and the discs ENTS1 and ENTS2, prevents any torsion from the actuator O10 acting on the mold OF.

Figure 27:
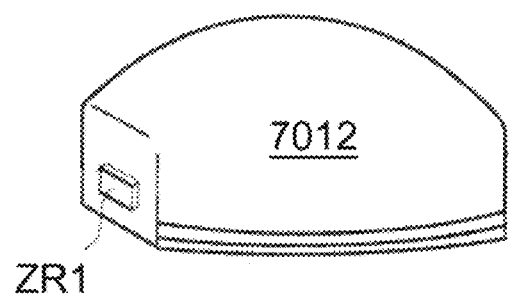
FIG. 27 shows an embodiment of a headlight lens.
Figure 28:
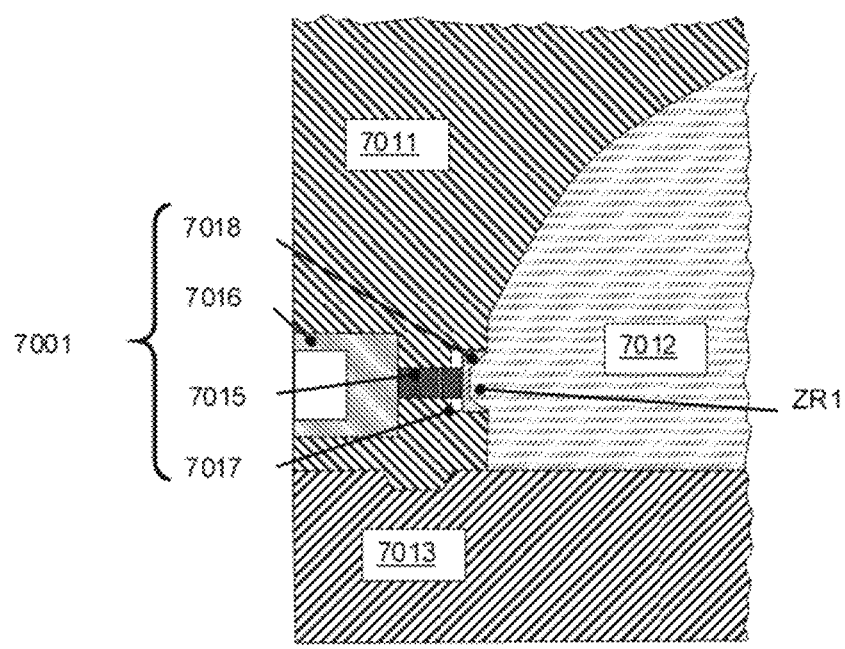
FIG. 28 shows an embodiment of a set of molds for press-molding a headlight lens according to FIG. 27.

The headlight lens 202 is not rotationally symmetrical but, like the headlight lens 7012, has a narrow side, as shown for example in FIG. 27. It can be provided, as shown in FIG. 27, that on at least one narrow side an integrally formed additional edge ZR1 is provided, which absorbs volume fluctuations in the gob or blank. This means that other tolerances can be dispensed with if, for example, the additional edge ZR1 completely absorbs the volume fluctuations. FIG. 28 shows an embodiment example of a mold set for press-molding of headlight lens 7012, where reference mark 7011 denotes a mold corresponding to mold OF and reference mark 7013 denotes a mold corresponding to mold UF. Reference character 7001 denotes an escape cavity slide whose maximum movement distance is denoted by reference character 7017 and is 1 mm in the present embodiment. The escape cavity slide 7001 comprises a plunger 7018 which can be pushed against the force of a spring 7015 in the direction of the maximum possible movement distance 7017. The escape cavity slide 7001 further comprises a preload tensioner 7016 for adjusting the force required to compress the escape cavity slide 7001 or its spring 7015.

Figure 29:
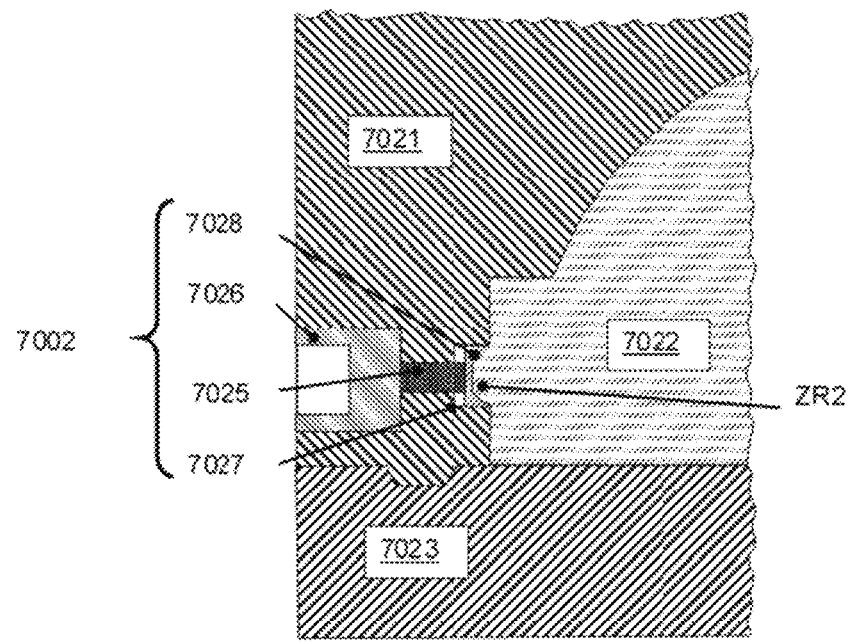
FIG. 29 shows an embodiment of a set of molds for press-molding a headlight lens.

FIG. 29 shows an embodiment of a mold set for blank molding of a headlamp lens 7022, which comprises a base edge, the outer side of which an additional edge ZR2 can be formed to accommodate volume variations of a blank. Here, reference mark 7021 denotes a mold corresponding to mold OF and reference mark 7023 denotes a mold corresponding to mold UF. Reference character 7002 denotes an escape cavity slide whose maximum movement distance is denoted by reference character 7027 and in the present embodiment is 1 mm. The escape cavity slide 7002 comprises a plunger 7028 that can be pushed against the force of a spring 7025 in the direction of the maximum possible movement distance 7027. The escape cavity slide 7002 also comprises a preload tensioner 7026 for adjusting the force required to compress the escape cavity slide 7002 or its spring 7025.

Figure 30:
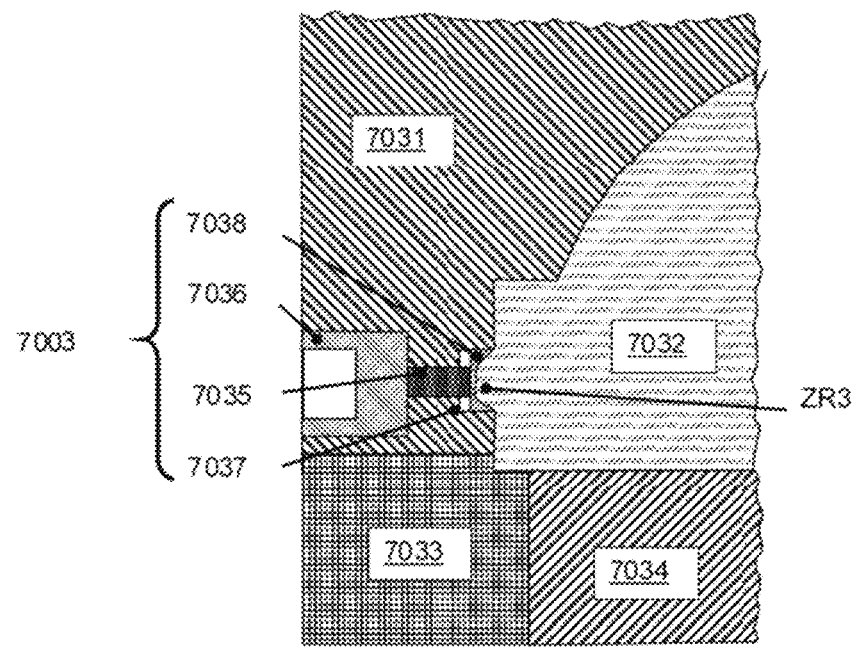
FIG. 30 shows a further embodiment of a set of molds for press-molding a headlight lens.

FIG. 30 shows an embodiment of a mold set for blank molding of a headlamp lens 7032, which comprises a base edge, the outer side of which an additional edge ZR3 can be formed to accommodate volume variations of a blank. Here, reference numeral 7031 denotes a mold corresponding to form OF, and reference numeral 7033 and 7034 denote partial molds of a mold corresponding to mold UF. Reference numeral 7003 designates an escape cavity slide whose maximum movement distance is designated by reference numeral 7037 and in the present embodiment is 1 mm. The escape cavity slide 7003 comprises a plunger 7038 which can be pushed against the force of a spring 7035 in the direction of the maximum possible movement distance 7037. The escape cavity slide 7000 further comprises a preload tensioner 7036 for adjusting the force required to compress the escape cavity slide 7003 or its spring 7035.

Each of the plungers 7018, 7028, 7038 in FIG. 28, FIG. 29 and FIG. 30 is shown in an embodiment, in which each plunger 7018, 7028, 7038 has an additional edge forming surface, where the edge forming surface molds, forms the additional edge ZR1, ZR2 or ZR3 of the headlight lens 7012, 7022 or 7032, respectively. The additional edge forming surfaces of the plungers 7018, 7028 or 7038 each comprises a rim section and a middle section, where the middle section is set back with respect to the rim section.

Figure 31:
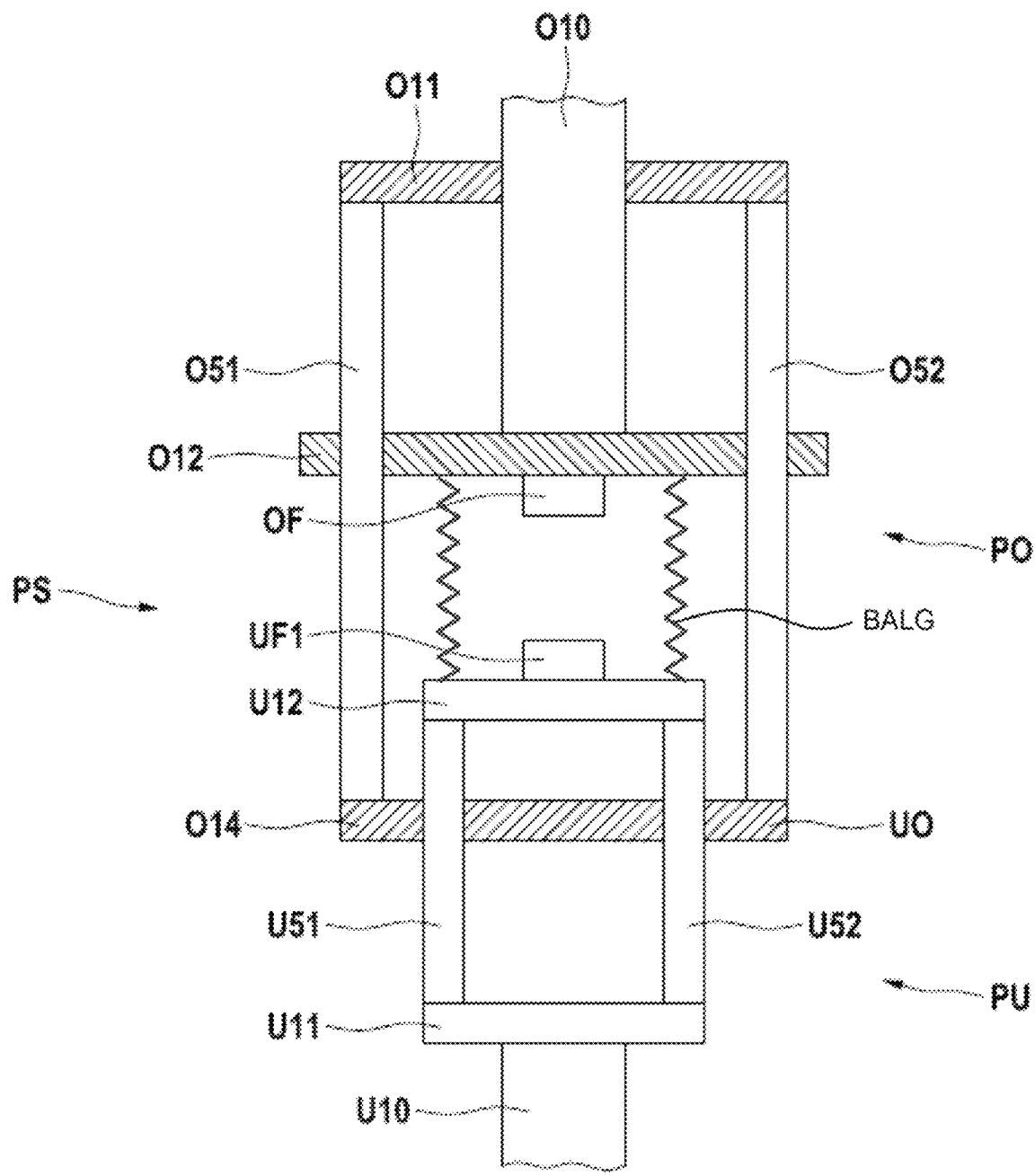
FIG. 31 shows an embodiment of a modification of the pressing station according to FIGS. 19, 20, 21, 22 and 23 for pressing under vacuum or near vacuum or negative pressure, explained on the basis of a modified representation of the schematic view according to FIG. 19.
Figure 32:
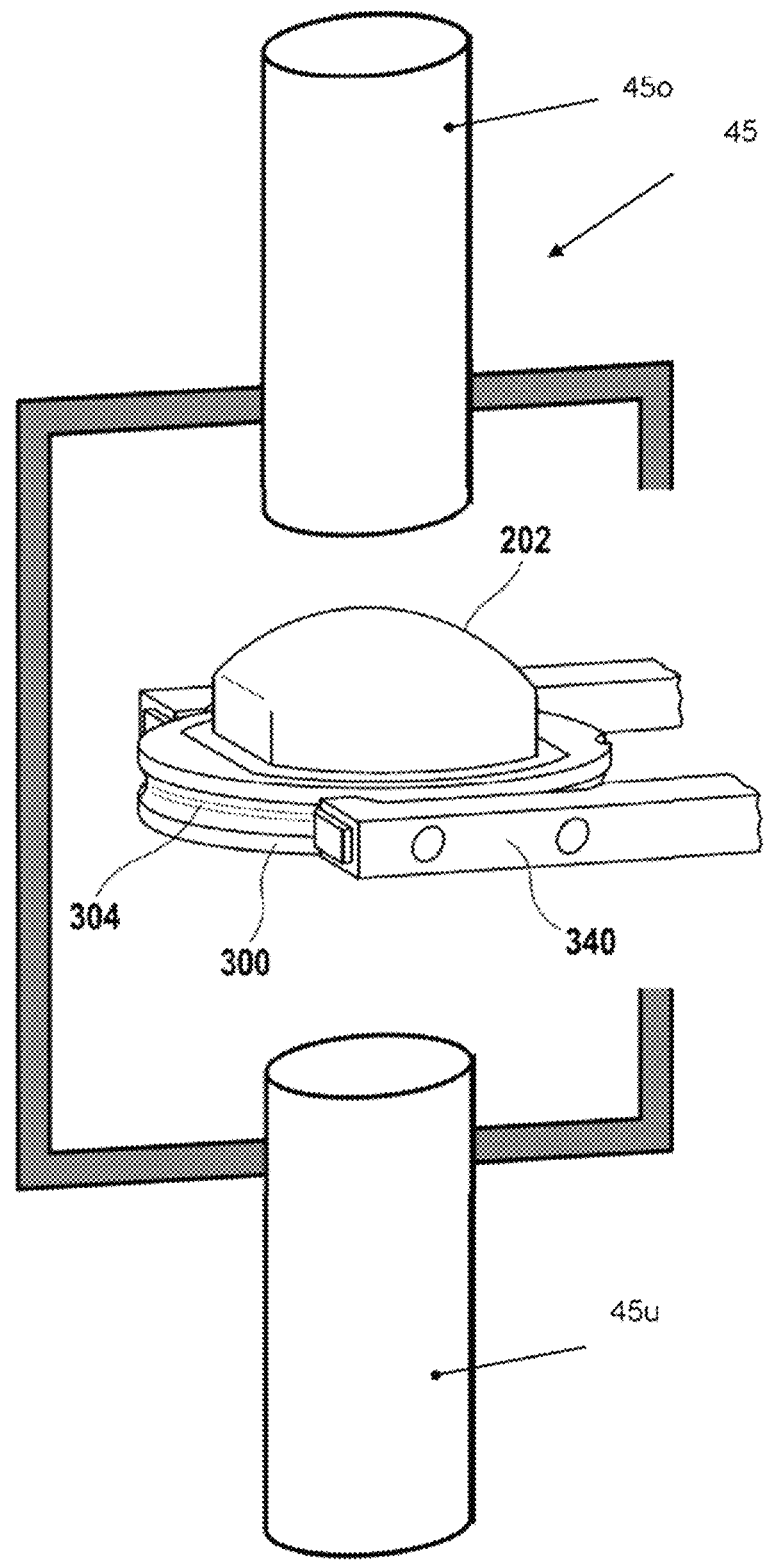
FIG. 32 shows a cross-sectional view of an embodiment of a surface-treatment station.

The method described may also be carried out in connection with pressing under vacuum or near vacuum or at least under negative pressure in a chamber, as disclosed by way of example in JP 2003-048728 A. The method described may also be carried out in connection with pressing under vacuum or near vacuum or at least under negative pressure by means of a bellows, as explained in the following on the basis of the pressing station PS in FIG. 31 by way of example. In this case, it is provided that a bellows BALG is provided or arranged between the movable guide element O12 and the mold-side movable connector U12 for closing the molds OF and UF in an airtight manner or at least in a substantially airtight manner. Suitable methods are for example disclosed in the above-mentioned JP 2003-048728 A (incorporated by reference in its entirety) and in WO 2014/131426 A1 (incorporated by reference in its entirety). In a corresponding configuration, a bellows may be provided, as disclosed in WO 201 4/1 31 426 A1, at least in a similar manner. It may be provided that the pressing of an optical element, such as a headlight lens, is carried out by means of at least one lower mold UF and at least one upper mold OF,
- (a) wherein the heated preform or blank or gob 4001 (glass) is placed in or on the lower mold UF,
- (b) wherein (subsequently or thereafter) the upper mold OF and the lower mold UF (are positioned relative to one another and) are moved towards one another without the upper mold OF and the lower mold UF forming a closed overall mold (for example far enough that the distance (for example the vertical distance) between the upper mold and the blank is no less than 4 mm and/or no greater than 10 mm),
- (c) wherein (subsequently or thereafter) the bellows BALG for producing an airtight space, in which the upper mold OF and the lower mold UF are arranged, is closed,
- (d) wherein (subsequently or thereafter) a vacuum or near vacuum or negative pressure is generated in the airtight space,
- (e) wherein (subsequently or thereafter) the upper mold OF and the lower mold UF are moved towards one another (for example vertically) for (press-)molding the optical lens element (for example on both sides or all sides), wherein it is for example provided that the upper mold OF and the lower mold UF contact one another or form a closed overall mold (in this case, the upper mold OF and the lower mold UF can be moved towards one another such that the upper mold OF is moved (vertically) towards the lower mold UF and/or the lower mold UF is moved (vertically) towards the upper mold OF),
- (f) wherein subsequently or thereafter normal pressure is generated in the airtight space,
- (g) wherein subsequently or thereafter, in a further embodiment, the seal is opened or returned to its starting position,
- (h) and wherein subsequently or thereafter or during steps f) and/or g), the upper mold OF and the lower mold UF are moved away from one another.

In a further embodiment, before pressing the optical element, such as a headlight lens (or between step (d) and step (e)), a predetermined waiting time is allowed to elapse. In a further embodiment, the predetermined waiting time is no greater than 3 seconds (minus the duration of step (d)). In a further embodiment, the predetermined waiting time is no less than 1 second (minus the duration of step (d)).

Figure 9:
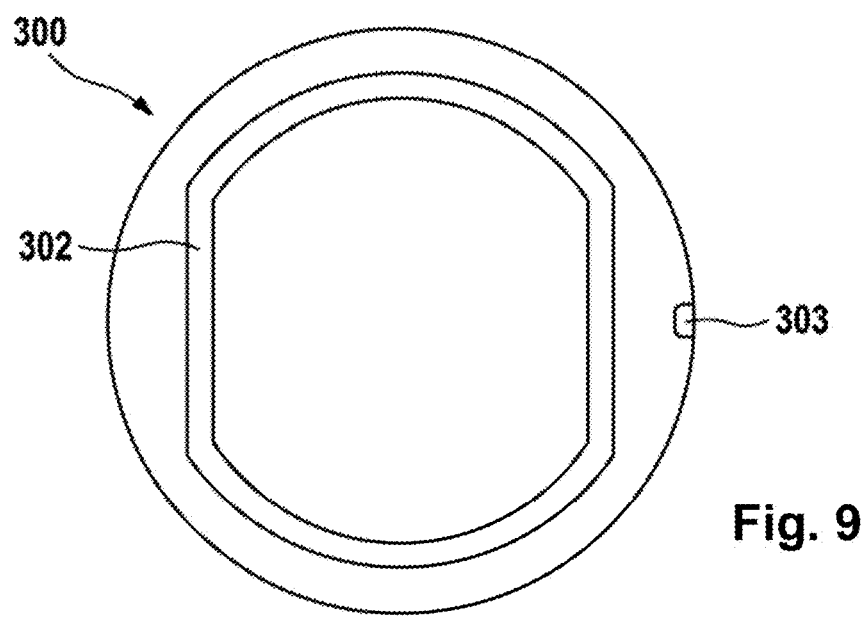
FIG. 9 shows an embodiment of a transport element.
Figure 12:
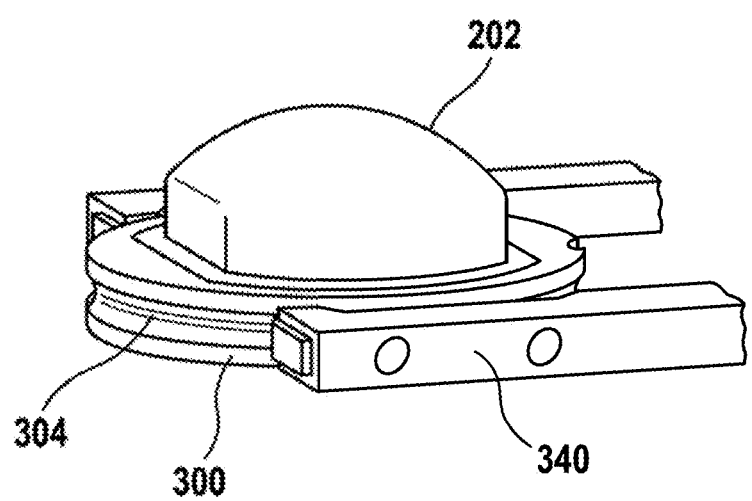
FIG. 12 shows a headlight lens on a transport element according to FIG. 9.

Following the pressing, the optical element (such as a headlight lens) is placed on a transport element 300 as shown in FIG. 9 by means of a transfer station 9. The annular transport element 300 shown in FIG. 9 consists of steel, for example of ferritic steel or martensitic steel. The annular transport element 300 comprises, on its inner face, a (corresponding) support surface 302, on which the optical element to be cooled, such as the headlight lens 202, is placed by its base edge, such that the optical surfaces, such as the surface 205, are prevented from being damaged. Therefore, the (corresponding) support surface 302 and the support surface 261 of the base edge 206 thus e.g. come into contact. Here, FIG. 12 shows the fixing and orientation of the headlight lens 202 on the transport element 300 by means of limiting surfaces. The limiting surfaces are for example orthogonal to the (corresponding) support surface 302. In this case, it is provided that the limiting surfaces have enough play relative to the headlight lens 202, such that the headlight lens 202 can be placed on the transport element 300 for example without the headlight lens 202 becoming tilted or jammed on the transport element 300.

Figure 10:
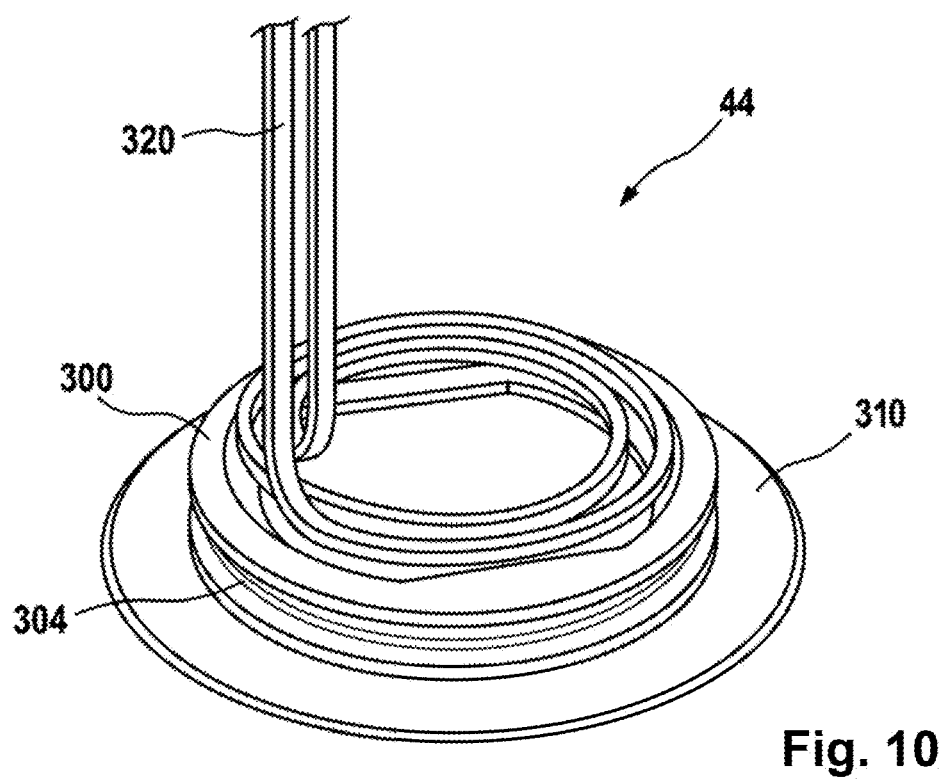
FIG. 10 shows an embodiment of a heating device for a transport element according to FIG. 9.
Figure 11:
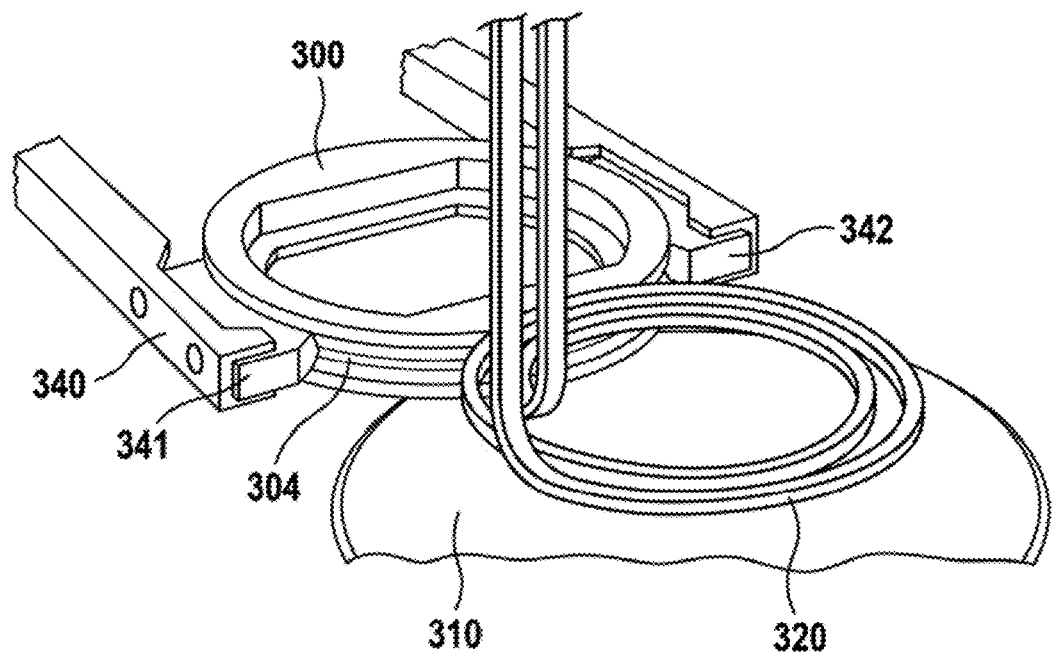
FIG. 11 shows an embodiment for removing a transport element according to FIG. 9 from a heating device according to FIG. 10.

In addition, before placing the headlight lens 202 on the transport element 300, the transport element 300 is heated such that the temperature of the transport element 300 is approximately +−50 K the temperature of the headlight lens 202 or the base edge 206. For example, the heating is carried out in a heating station 44 by means of an induction coil 320, as shown in FIGS. 10 and 11. In these figures, the transport element 300 is placed on a support 310 and is for example heated by means of the induction coil/induction heater 320 at a heating rate of 30-50 K/s, for example in less than 10 seconds. The transport element 300 is then grasped by a gripper 340, as shown in FIGS. 10 and 12. For this purpose, the transport element 300 for example also has an indentation 304 on its outer edge, which is designed to be circumferential in an illustrative embodiment. For correct orientation, the transport element 300 comprises a marker groove 303. The transport element 300 is guided to the press 8 by means of the gripper 340 and, as shown in FIG. 12, the headlight lens 202 is transferred from the press 8 to the transport element 300 and placed thereon.

In a suitable configuration, it is provided that the support 310 is designed as a rotatable plate. The transport element 300 is thus placed on the support 310 designed as a rotatable plate by hydraulic and automated movement units (e.g. by means of the gripper 340). Centering is then carried out by two centering jaws 341 and 342 of the gripper 340 and specifically such that the transport elements are oriented in a defined manner by means of the marker groove 303, which is or can be detected by means of a position sensor. Once this transport element 300 has reached its linear end position, the support 340 designed as a rotatable plate begins to rotate until a position sensor has detected the marker groove 303.

In a process step 126, an optical element or the headlight lens 202 is moved through a surface-treatment station 45 on the transport element 300. Thereby, the optically active surface 204 of the headlight lens 202 is sprayed with surface-treatment agent by means of a dual-substance nozzle 45o and at least one optically active surface of the optical element, such as the optically active surface 205 of the headlight lens 202, is sprayed with surface-treatment agent by means of a dual-substance nozzle 45u. The spraying process lasts no longer than 12 seconds, for example no longer than 8 seconds, for example no less than 2 seconds. The dual-substance nozzles 45o and 45u each comprise an inlet for atomizing air and an inlet for liquid, in which the surface-treatment agent is supplied, which is converted into a mist or spray mist by means of the atomizing air and exits through a nozzle. In order to control the dual-substance nozzles 45o and 45u, a control air port is also provided, which is actuated by means of a control assembly 15 described in the following.

By means of the proposed method for producing an optical element or a headlight lens, weather resistance and/or hydrolytic resistance comparable to that of borosilicate glass is obtained. Furthermore, the costs of the production process are only slightly higher than those of the production process for optical elements or headlight lenses having weather resistance and/or hydrolytic resistance corresponding to soda-lime glass.

Figure 13:
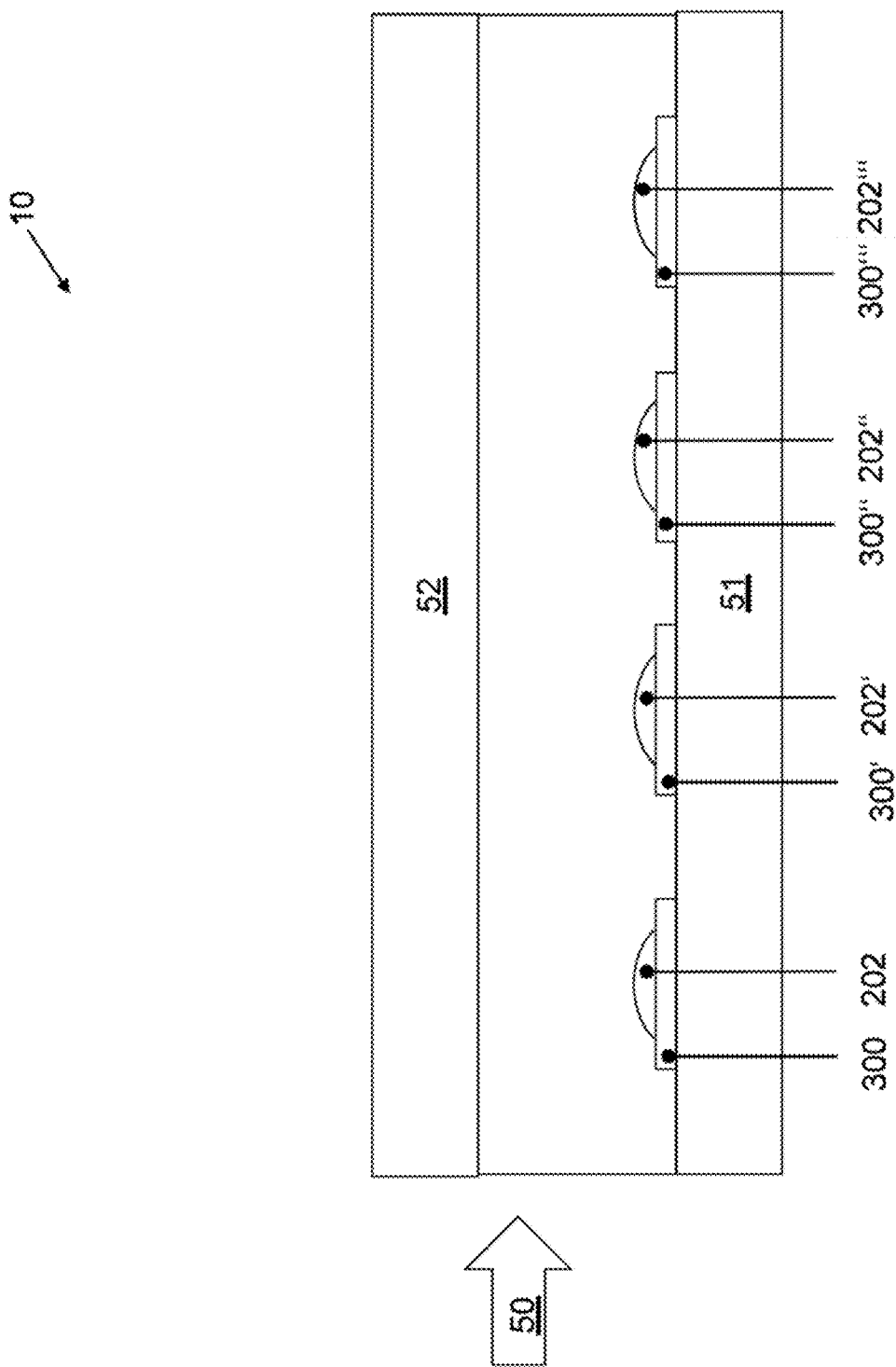
FIG. 13 shows a schematic view of an embodiment of a cooling path.

The transport element 300 together with the headlight lens 202 is then placed on the cooling path 10. In a process step 127, the headlight lens 202 is cooled by means of the cooling path 10. FIG. 13 is a detailed schematic view of the exemplary cooling path 10 from FIG. 1. The cooling path 10 comprises a tunnel which is or can be heated by means of a heating apparatus 52 and through which the headlight lenses 202, 202', 202", 202'" are moved slowly on transport elements 300, 300', 300", 300'" in the movement direction indicated by an arrow 50. In this process, the heating power decreases in the movement direction of the transport elements 300, 300', 300", 300'" together with the headlight lenses 202, 202', 202", 202'". For moving the transport elements 300, 300', 300", 300'" together with the headlight lenses 202, 202', 202", 202'", a conveyor belt 51 is e.g. provided, for example made up of chain members or implemented as a series of rollers.

At the end of the cooling path 10, a removal station 11 is provided, which removes the transport element 300 together with the headlight lens 202 from the cooling path 10. In addition, the removal station 11 separates the transport element 300 and the headlight lens 202 and transfers the transport element 300 to a return transport apparatus 43. From the return transport apparatus 43, the transport element 300 is transferred by means of the transfer station 9 to the heating station 44, in which the transport element 300 is placed on the support 310 designed as a rotatable plate and is heated by means of the induction heater 320.

A process step 128 lastly follows, in which residues of the surface-treatment agent on the lens are washed away in a washing station 46.

The device shown in FIG. 1 also comprises a control assembly 15 for controlling and/or regulating the device 1 shown in FIG. 1. The device 1A shown in FIG. 2A also comprises a control assembly 15A for controlling and/or regulating the device 1A shown in FIG. 2A. The device 1B shown in FIG. 2B also comprises a control assembly 15B for controlling and/or regulating the device 1B shown in FIG. 2B. The control assemblies 15, 15A and 15B for example ensure that the individual process steps are continuously interlinked.

The terms preform, gob and blank are used synonymously.

The elements in the figures are drawn with a view to simplicity and clarity and not necessarily to scale. For example, the scale of some elements is exaggerated relative to other elements to enhance understanding of the embodiments of the present invention.

The claimed or disclosed process relates to alternative embodiments for precision molding of lenses, headlight lenses, vehicle headlight lenses and other optical elements.

LIST OF REFERENCE SIGNS 1, 1A, 1B device
2 melting unit
2B adjustable outlet
3 preform device
4, 4A, 4B transfer station
5A, 5B, 5C cooling apparatuses
6A, 6B, 6C heating apparatuses
7 transfer station
8 pressing station
9 transfer station
10 cooling path
11 removal station
15, 15A, 15B control assembly
20 motor vehicle
41 transport apparatus
42 transport apparatus
43 return transport apparatus
44 heating station
45 surface treatment station
45o dual-substance nozzle
45u dual-substance nozzle
46 washing station
50 arrow
51 conveyor belt
52 heating device
120 process step
121 process step
122, 122' process step
123, 123' process step
124, 124' process step
125 process step
126 process step
127 process step
128 process step
130 preform
131 temperature gradient
132 temperature gradient
201, 201', 201" motor vehicle headlight
202 headlight lens
203 lens body
204 substantially convex (for example optically active) surface
205 substantially planar (for example optically effective) surface
206 base edge
210 light source
212 reflector
214 shield
215 edge
220 bright-dark-boundary
230 optical axis of 202

261 surface of base edge 206
300 transport element
302 support surface
303 marker groove
304 indentation
310 support
320 induction coil/induction heater
340 gripper
341, 342 centering jaws
400, 500 support devices
401, 501 support body
402, 502 support surface
403, 503 base surface
411, 511 flow channels
412, 512 flow channels
421, 521 metal filler material
422, 522 metal filler material
7011, 7021, 7031 mold
7012, 7022, 7032 headlight lens
7013, 7023, 7033, 7034 mold
7003, 7002, 7001 escape cavity slide
7017, 7027, 7037 movement distance
7018, 7028, 7038 plunger
7015, 7025, 7035 spring
7016, 7026, 7036 preload tensioner
800 pressing station
801 lower pressing unit
802 upper pressing unit
811, 812, 814, 815 rod
816 upper connecting part
817 lower plate
821 plate
822 lower press mold
823 upper press mold
840 press drive
841, 842, 843 rods
850 press drive
851, 852, 853 guide rod
H851, H852, H853 sleeves
L851, L853 bearing
855 plate
870 movement mechanism
872 induction loop
879 induction heating
4001 gob
4002 nut
5000 hood-type annealing furnace
5001 heating coil
5002, 5202, 5302 protective cover
5112, 5212, 5312 cylindrical region
5132 rounded region
5122, 5222, 5322 covering region
5242, 5342 conical area
5232, 5332 curvature
DA diameter of 204
DB diameter of 205
DBq orthogonal diameter to DB
DL diameter of 202
DLq orthogonal diameter to DL
F2 surround sensor system
F3 controller
F4 illumination device
F5 lens
F20, F201 vehicle headlight
F41 light source assembly
F42 light-shaping optics
F421 light exit surface of F4
L4 light
L41 light irradiated into F42
L5 illumination pattern
M2 sensor surround system
M3 controller
M4 light emission unit
ML4 light
M5 concave lens
ML5 further shaped light
M6 projection optics
ML6 resulting light distribution
G20, M20 headlight
G2 surround sensor system
G3 controller
G4 controller
G5 illumination device
GL5 light generated by GL5
G6 system of micromirrors
GL6 illumination pattern
G7 projection optics
GL7 light
GL7A, GL7B, GL7C illumination pattern
Pmax, Pmin light output
PTC temperature sensor
PS pressing station
PO upper pressing unit
PU lower pressing unit
SPLT gap
OF, OF1 upper mold
UF, UF1 lower mold
UFT1, UFT2 lower mold part
U10, O10 actuator
U11, U12 movable connector
U51, U52 movable guide rods
UO fixed guide element
O11 actuator-side connector
O12 movable guide element
O14 mold-side connector
O51, O52 fixed guide rods
P811, P812 reinforcement profile
SP811, SP812,
SP814, SP815 clamps
ΔKIPOF, ΔKIPUF maximum tilting
ACHSOF, ACHSUF actual pressing direction
ACHSOF*, ACHSUF* target pressing direction
ΔVEROF, ΔVERUF
ENTR ring
ENTS1, ENTS2 discs
BALG bellows
ZR1, ZR2, ZR3 additional edge

The invention claimed is:
1. A process for manufacturing an optical lens, the process comprising:
providing a blank of glass, the blank having a volume;
providing a first mold;
providing at least a second mold; the second mold comprising an escape cavity slide, the escape cavity slide comprising a plunger and an elastic element mechanically coupled to the plunger;
heating the blank;
press-molding the blank to form an optical lens by moving first mold and second mold towards each other to form a closed cavity; due to press-molding
the first mold forming the first optical surface of the lens; the first optical surface being within the intended light path through the lens, the second mold forming a second optical surface of the lens and at least part of a base edge having a volume; the second optical surface being within the intended light path through the lens; the base edge being not within the intended light path through the lens;

the plunger being displaced depending on the volume of the blank such that an additional edge of the optical lens is formed by means of the escape cavity slide, the volume of the additional edge depending on the volume of the blank.

2. The process of claim 1, wherein the elastic element being a spring.

3. The process of claim 1, wherein the additional edge not being within the intended light path through the lens.

4. The process of claim 1, wherein the plunger being displaced no more than 1 mm.

5. The process of claim 4, wherein the plunger having an additional edge forming surface, the additional edge forming surface comprising a rim section and a middle section being set back with respect to the rim section.

6. The process of claim 1, wherein the plunger having an additional edge forming surface, the additional edge forming surface comprising a rim section and a middle section being set back with respect to the rim section.

7. The process of claim 6, wherein the plunger being displaced no more than 1 mm.

8. The process of claim 7, wherein the plunger having an edge forming surface, the edge forming surface comprising a rim section and a middle section being set back with respect to the rim section.

9. A process for manufacturing an optical lens, the process comprising:

providing a blank of glass, the blank having a volume;
providing a first mold;
providing at least a second mold, the second mold comprising an escape cavity slide, the escape cavity slide comprising a plunger and an elastic element mechanically coupled to the plunger;

heating the blank;

press-molding the blank to form an optical lens by moving first mold and second mold towards each other to form a closed cavity; due to press-molding the first mold forming the first optical surface of the lens; the first optical surface being within the intended light path through the lens, the second mold forming a second optical surface of the lens and at least part of a base edge having a volume; the second optical surface being within the intended light path through the lens; the base edge being not within the intended light path through the lens;

the plunger being displaced depending on the volume of the blank such that extending from the base edge an additional edge of the optical lens that extends from the base edge is formed by means of the escape cavity slide, the volume of the additional edge depending on the volume of the blank wherein the plunger having an additional edge forming surface, the additional edge forming surface comprising a rim section and a middle section being set back with respect to the rim section.

10. The process of claim 9, wherein the elastic element being a spring.

11. The process of claim 9, wherein the additional edge not being within the intended light path through the lens.

12. The process of claim 9, wherein the plunger being displaced no more than 1 mm.

* * * * *